(12) United States Patent
Takano et al.

(10) Patent No.: US 9,771,118 B2
(45) Date of Patent: Sep. 26, 2017

(54) VEHICLE

(71) Applicant: YAMAHA HATSUDOKI KABUSHIKI KAISHA, Iwata-shi, Shizuoka (JP)

(72) Inventors: Kazuhisa Takano, Shizuoka (JP); Keisuke Terada, Shizuoka (JP); Nobuhiko Hirakawa, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/279,702

(22) Filed: Sep. 29, 2016

(65) Prior Publication Data

US 2017/0088218 A1    Mar. 30, 2017

(30) Foreign Application Priority Data

Sep. 30, 2015 (JP) .................. 2015-194213

(51) Int. Cl.
*B62K 5/10* (2013.01)
*B60G 13/00* (2006.01)
(Continued)

(52) U.S. Cl.
CPC .............. *B62K 5/10* (2013.01); *B60G 13/003* (2013.01); *B62K 5/027* (2013.01); *B62K 5/05* (2013.01);
(Continued)

(58) Field of Classification Search
CPC ........................... B62K 2005/001; B62K 5/08
See application file for complete search history.

(56) References Cited

U.S. PATENT DOCUMENTS 4,351,410 A   9/1982   Townsend
7,708,291 B1  5/2010   Henderson
(Continued)

FOREIGN PATENT DOCUMENTS

GB         729782 A    5/1955
JP       59-20782 A    2/1984
(Continued)

OTHER PUBLICATIONS

Yamaha, "Parts Catalogue", MW125, Jul. 31, 2014, 67 pages.
Official Communication issued in corresponding European Patent Application No. 16190760.5, dated May 12, 2017.

*Primary Examiner* — Nicole T Verley
(74) *Attorney, Agent, or Firm* — Keating and Bennett, LLP

(57) ABSTRACT

A vehicle includes a steering force transmission including a steering force input, a steering shaft that is connected to the steering force input and which is supported by a first shaft support so as to turn about a rear steering axis, a connector that is connected to the steering shaft and displaced as the steering shaft turns, and a relay shaft that is connected to the connector to turn about a front steering axis as the connector is displaced, which is supported by a second shaft support that is provided ahead of the first shaft support to turn a right front wheel and a left front wheel as the second shaft support turns. The first shaft support is fixed to a portion of a body frame that extends to the rear from the link support so that the rear steering axis of the steering shaft is disposed behind a movable range of a rear cross element of a linkage in relation to a front-and-rear direction of a middle upper axis.

11 Claims, 13 Drawing Sheets

(51) Int. Cl.
  *B62K 5/05* (2013.01)
  *B62K 5/08* (2006.01)
  *B62K 5/027* (2013.01)
  *B62K 21/18* (2006.01)
  *B62K 25/08* (2006.01)
  *B62K 5/00* (2013.01)

(52) U.S. Cl.
  CPC ............... *B62K 5/08* (2013.01); *B62K 21/18* (2013.01); *B62K 25/08* (2013.01); *B60G 2300/122* (2013.01); *B62K 2005/001* (2013.01)

(56) References Cited

U.S. PATENT DOCUMENTS

| | | | | |
|---|---|---|---|---|
| 8,262,111 | B2* | 9/2012 | Lucas | B60G 3/20 |
| | | | | 180/210 |
| 8,814,186 | B1* | 8/2014 | Rinda | B62K 5/06 |
| | | | | 280/124.135 |
| 2013/0168944 | A1 | 7/2013 | Bartolozzi et al. | |
| 2015/0232147 | A1* | 8/2015 | Hirayama | B62K 21/02 |
| | | | | 280/267 |
| 2015/0259027 | A1 | 9/2015 | Takano et al. | |
| 2015/0321721 | A1* | 11/2015 | Sasaki | B62K 5/05 |
| | | | | 180/210 |
| 2016/0107713 | A1* | 4/2016 | Takano | B62K 5/027 |
| | | | | 180/210 |
| 2016/0152278 | A1* | 6/2016 | Kawashiri | B60Q 1/0035 |
| | | | | 180/89.1 |
| 2016/0152293 | A1* | 6/2016 | Hirayama | B62K 5/05 |
| | | | | 280/124.103 |
| 2016/0185413 | A1* | 6/2016 | Takano | B62K 21/00 |
| | | | | 280/124.103 |
| 2016/0244118 | A1* | 8/2016 | Tanabe | B62J 23/00 |
| 2016/0280193 | A1* | 9/2016 | Seto | B60T 8/1706 |

FOREIGN PATENT DOCUMENTS

| | | | | |
|---|---|---|---|---|
| JP | EP-2130731 | B1* | 7/2015 | ............ B60T 8/3685 |
| JP | EP-3069979 | A2* | 9/2016 | ............ B60G 13/003 |
| WO | 2012/007819 | A1 | 1/2012 | |
| WO | 2014/065396 | A1 | 5/2014 | |

* cited by examiner

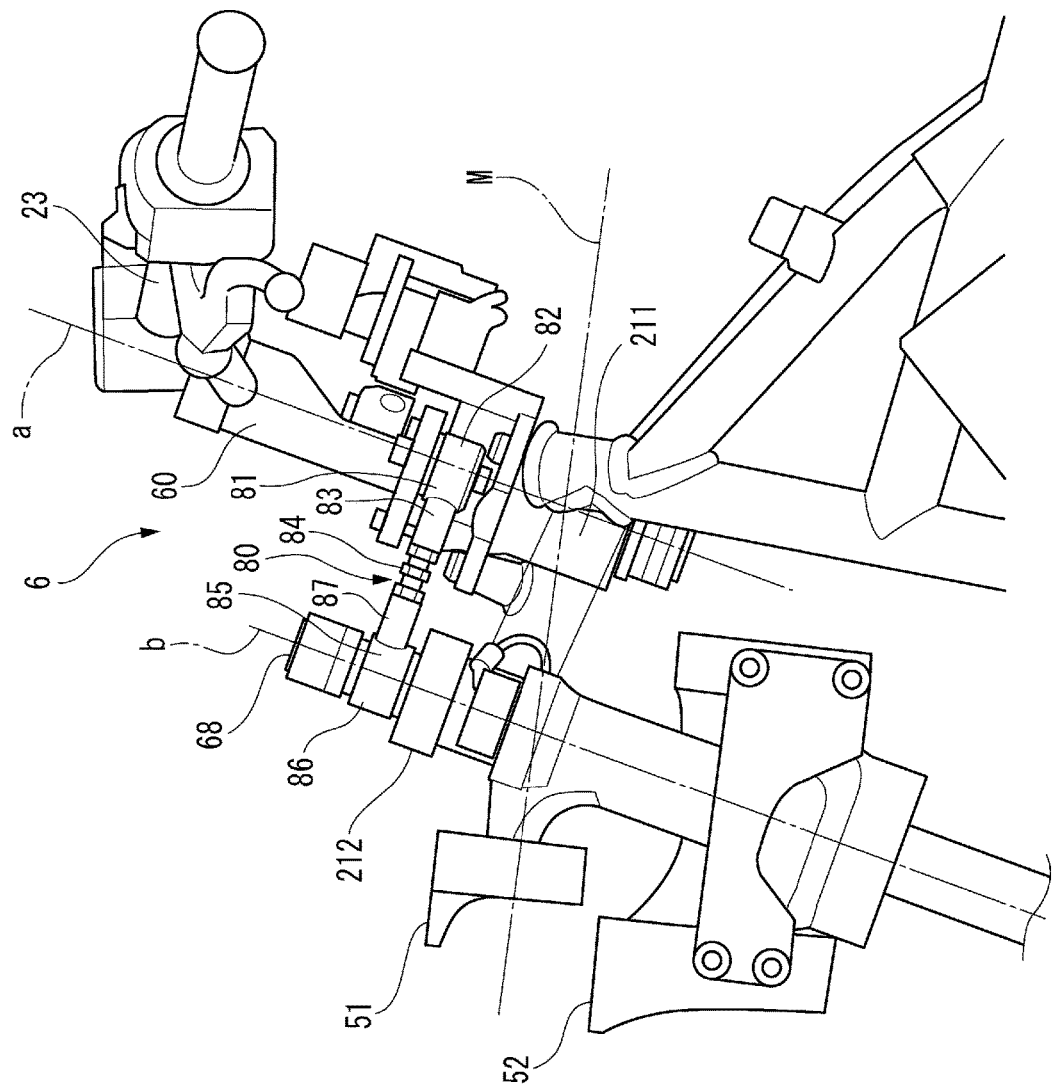
FIG. 8
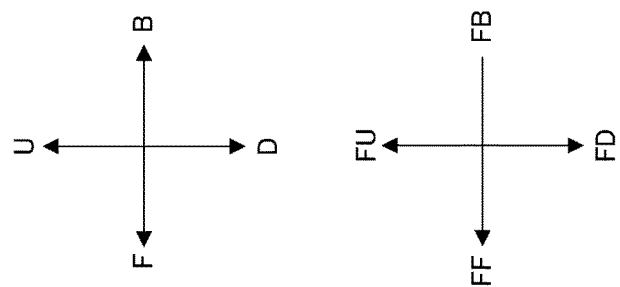

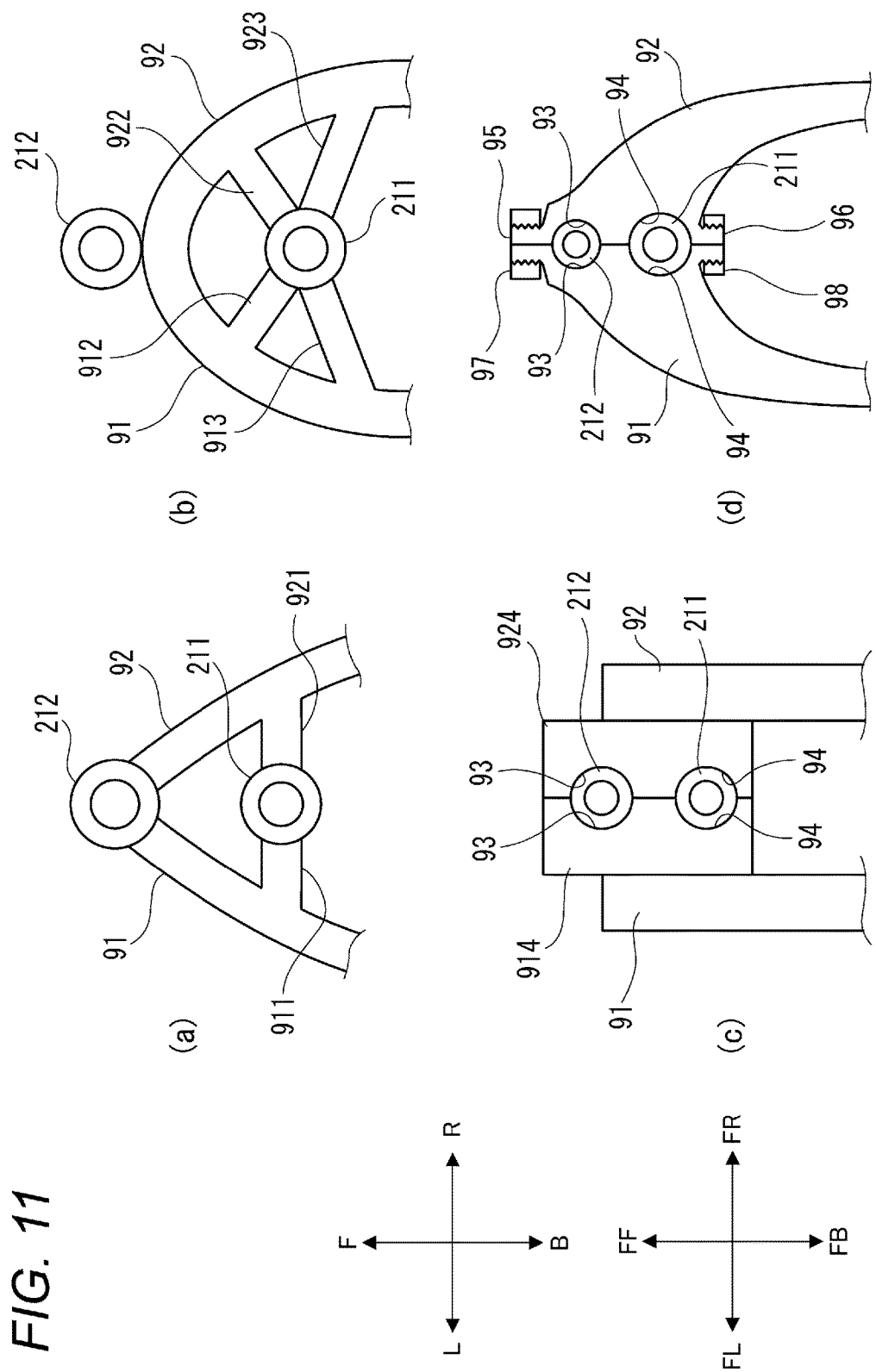

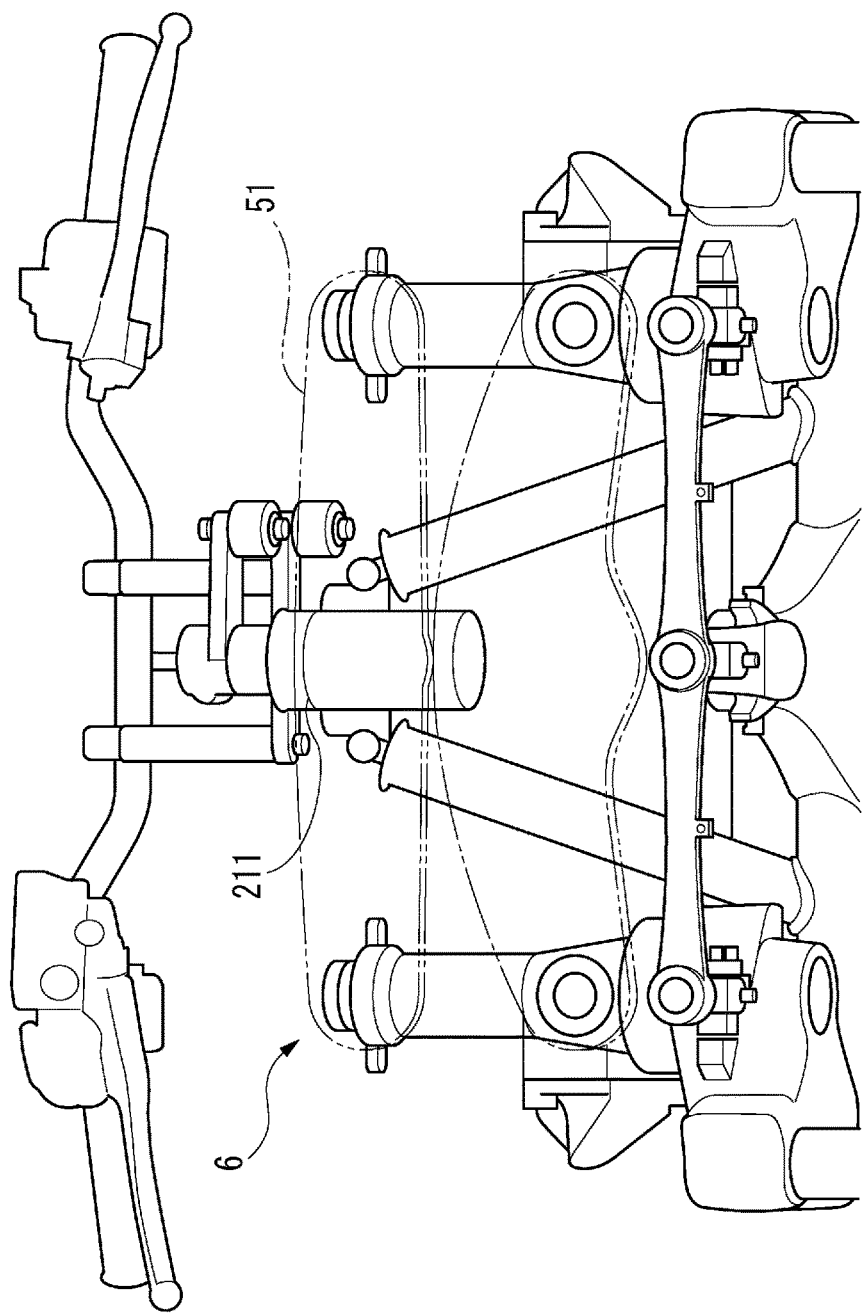
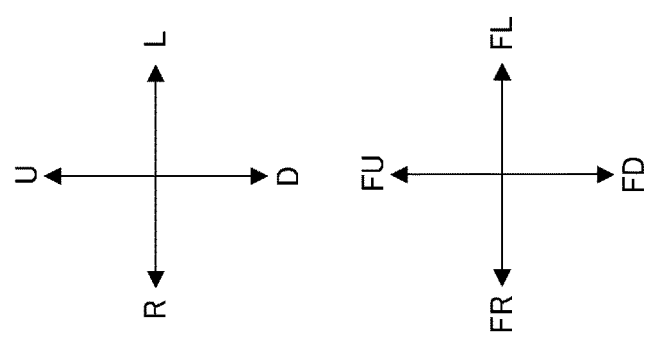
FIG. 12

VEHICLE

BACKGROUND OF THE INVENTION

1. Field of the Present Invention

The present invention relates to a vehicle including a body frame that is able to lean and two front wheels that are aligned side by side in a left-and-right direction.

2. Description of the Related Art

A vehicle including a body frame that is able to lean and two front wheels that are aligned side by side in the left-and-right direction is well known through International Patent Publication No. 2014/065396 or the like. In general, the vehicle including the body frame that is able to lean and the two front wheels that are aligned side by side in the left-and-right direction is able to turn with the body frame inclined or caused to lean relative to a vertical direction. More specifically, the body frame leans to the right of the vehicle when the vehicle turns right, whereas when the vehicle turns left, the body frame leans to the left of the vehicle. In this vehicle, a space defined between the two front wheels that are aligned side by side in the left-and-right direction of the body frame is narrower than a space defined between two front wheels of a general four-wheeled motor vehicle. The vehicle including the two front wheels that are aligned in the left-and-right direction and the body frame that is able to lean is compact in size in the left-and-right direction.

The vehicle described in International Patent Publication No. 2014/065396 includes a parallelogram type linkage that supports the two front wheels so as to be displaced in up-and-down directions of the body frame relative to the body frame and shock absorbers that support the two front wheels so as to be displaced in the up-and-down directions of the body frame relative to the linkage to absorb shocks from a road surface.

The parallelogram type linkage is disposed above the two front wheels. Due to this, the vehicle equipped with the parallelogram type linkage is compact in size in relation to the left-and-right direction of the body frame, compared with a vehicle equipped with a double wishbone type linkage disposed between the two front wheels.

The parallelogram type linkage includes cross members and side members. The cross members are supported on the body frame so as to turn about axes that extend in the front-and-rear direction of the body frame. The side members are connected to left portions and right portions of the cross members so as to turn about axes that extend in the front-and-rear direction of the body frame. Namely, the cross members and the side members that define the parallelogram type linkage turn about the axes that extend in the front-and-rear direction of the body frame. Due to this, when the parallelogram type linkage operates, a movable range where the cross members and the side members pass is small in the front-and-rear direction of the body frame.

In this way, the vehicle equipped with the parallelogram type linkage that is described in International Patent Publication No. 2014/065396 is a vehicle that is compact in size in the left-and-right direction and the front-and-rear direction of the body frame.

In the vehicle described in International Patent Publication No. 2014/065396, it is desired that a maximum angle at which the vehicle is inclined or caused to lean to the left-and-right direction of the vehicle (hereinafter, referred to as a maximum banking angle) is increased greatly. Increasing a distance between a right member including a right shock absorber and a right front wheel and a left member including a left shock absorber and a left front wheel in the left-and-right direction of the body frame so as to avoid the interference of the right member with the left member increases the maximum banking angle.

However, in case a dimension in the left-and-right direction of the cross members is increased to increase the distance between the right member and the left member, the vehicle is enlarged in size in the left-and-right direction. In particular, as a result of the distances from the turning centers of the cross members about which the cross members turn relative to the body frame to the left and right side members becoming long, the movable range of the linkage when the linkage operates is enlarged not only in the left-and-right direction but also in an up-and-down direction of the body frame.

SUMMARY OF THE INVENTION

Preferred embodiments of the present invention provide a vehicle that has a large maximum banking angle and which prevents an enlargement in the size of the vehicle not only in a left-and-right direction but also in an up-and-down direction of a body frame.

According to a preferred embodiment of the present invention, a vehicle include a body frame that is able to lean to the right of the vehicle when the vehicle turns right and lean to the left of the vehicle when the vehicle turns left and which includes a link support at a front portion thereof; a right front wheel and a left front wheel that are aligned side by side in a left-and-right direction of the body frame; a right shock absorber that supports the right front wheel at a lower portion thereof and which attenuates an upward displacement of the right front wheel towards an upper portion thereof in an up-and-down direction of the body frame; a left shock absorber that supports the left front wheel at a lower portion thereof and which attenuates an upward displacement of the left front wheel towards an upper portion thereof in the up-and-down direction of the body frame; a linkage that supports the right shock absorber and the left shock absorber so as to be displaced relative to the body frame; and a steering transmission that transmits a steering force to the right front wheel and the left front wheel, wherein the linkage includes a right side member that is connected to an upper portion of the right shock absorber so as to turn about a right steering axis that extends in the up-and-down direction of the body frame; a left side member that is connected to an upper portion of the left shock absorber so as to turn about a left steering axis that is parallel to the right steering axis; an upper cross member that is connected to an upper portion of the right side member at a right portion so as to turn about a right upper axis that extends in a front-and-rear direction of the body frame, which is connected to an upper portion the left side member at a left portion so as to turn about a left upper axis that is parallel to the right upper axis, and which is connected to the link support at a middle portion so as to turn about a middle upper axis that is parallel to the right upper axis and the left upper axis; and a lower cross member that is connect to a lower portion of the right side member at a right portion so as to turn about a right lower axis that is parallel to the right upper axis, which is connected to a lower portion of the left side member at a left portion so as to turn about a left lower axis that is parallel to the left upper axis, and which is connected to the link support at a middle portion so as to turn about a middle lower axis that is parallel to the middle upper axis, wherein at least one of the upper cross member and the lower cross member includes a front cross element that is disposed ahead of the link support in relation to the front-and-rear direction of the body frame and a rear cross element that is disposed behind the link support in relation to the front-and-rear direction of the body frame, the steer transmission includes a steering force input into which a steering force is inputted; a steering shaft that is connected to the steering force input and which is supported on a first shaft support so as to turn about a rear steering axis that extends in an up-and-down direction of the body frame; a connector that is connected to the steering shaft and which is displaced as the steering shaft turns; and a relay shaft that is connected to the connector, which is able to turn about a front steering axis that extends in the up-and-down direction of the body frame as the connector is displaced, which is supported on a second shaft support that is provided ahead of the first shaft support in the front-and-rear direction of the body frame, and which steers the right front wheel and the left front wheel as the second shaft support turns, and the first shaft steering support that supports the steering shaft is fixed to a portion of the body frame that extends rearwards from the link support so that at least a portion of the rear steering axis of the steering shaft is disposed behind a movable range of the rear cross element of the linkage in relation to a front-and-rear direction of the middle upper axis.

According to the preferred embodiment described above, the following advantageous effect is provided. When attempting to set a large maximum banking angle, as has been described above, the distance between the right member including the right shock absorber and the right front wheel and the left member including the left shock absorber and the left front wheel is increased so as to avoid interference between the right member and the left member. This enlarges not only the size of the cross members of the linkage in the left-and-right direction but also the movable range of the linkage in the left-and-right direction and the up-and-down direction. Due to this, in order to avoid interference with the linkage, the steering force input such as the handlebar needs to be disposed higher. In this way, when attempting to set a large maximum banking angle of the vehicle, the steering force input has to be set in a higher position, which enlarges the size of the vehicle in the up-and-down direction.

On the other hand, in general, the steering force input is disposed in a position where a rider who sits on the seat is able to extend his or her arms to reach it. Namely, the position where to dispose the steering force input is limited by the sitting position of the rider. The sitting position of the rider cannot be set in an unreasonably high position because the rider sitting on the seat has to be able to put on his or her feet on the ground. Namely, the sitting position of the rider cannot be set high, and this sitting position of the rider prevents the steering input from being disposed in a high position.

In this way, even when attempting to set a large maximum banking angle of the vehicle, it is difficult to dispose the steering force input in a position where interference with the linkage is avoided due to the positional relationship with the sitting position of the rider.

Then, according to the preferred embodiment described above, the rear steering axis that represents the turning center of the steering force input is disposed behind the movable range of the rear cross element of the linkage. This obviates the necessity of disposing the steering force input in a high position to avoid interference with the linkage, thus making it possible for the steering force input to be disposed in a reachable low position by the rider.

In addition, the rear steering axis is disposed behind the movable range of the rear cross element of the linkage. This makes it difficult for the vehicle to be enlarged in the up-and-down direction even though the linkage and the movable range of the linkage are disposed higher towards the area that is originally occupied by the steering force input because the steering force input is disposed not above the linkage but behind the linkage. Additionally, even though the dimension in the left-and-right direction of the cross members is increased to set a large maximum banking angle while avoiding interference with the left member and the right member, it is difficult for the vehicle to be enlarged in the up-and-down direction by positioning the movable range of the linkage in the area that is originally occupied by the steering force input.

In addition, since the parallelogram type linkage including the members that turn about the axes that extend in the front-and-rear direction, even though the maximum banking angle is increased, it is difficult for the movable range of the linkage to enlarge in the front-and-rear direction.

In this way, a vehicle is provided which has a large maximum banking angle and which is prevented from being enlarged not only in the front-and-rear direction but also in the up-and-down direction.

In a preferred embodiment of the present invention, the right shock absorber is preferably a telescopic shock absorber including a right shock absorber including a right inner tube and a right outer tube and that supports the right front wheel so as to be displaced as a result of the right inner tube and the right outer tube being displaced relatively along a right extending and contracting axis that extends in the up-and-down direction of the body frame; and a right guide including a right guide rod and a right support that supports the right guide rod so as to slide along an axis that is parallel to the right extending and contracting axis to permit a relative displacement between the right inner tube and the right outer tube along the right extending and contracting axis while preventing relative turning of the right inner tube to the right outer tube about the right extending and contracting axis, and the left shock absorber is preferably a telescopic shock absorber including a left shock absorber including a left inner tube and a left outer tube and that supports the left front wheel so as to be displaced as a result of the left inner tube and the left outer tube being displaced relatively along a left extending and contracting axis that extends in the up-and-down direction of the body frame; and a left guide including a left guide rod and a left support that supports the left guide rod so as to slide along an axis that is parallel to the left extending and contracting axis to permit a relative displacement between the left inner tube and the left outer tube along the left extending and contracting axis while preventing relative turning of the left inner tube to the left outer tube about the left extending and contracting axis.

According to the vehicle configured as above, the right shock absorber extends and contracts along the right extending and contracting axis in the up-and-down direction of the body frame. The left shock absorber extends and contracts along the left extending and contracting axis in the up-and-down direction of the body frame. Namely, even when the right shock absorber and the left shock absorber are operated, a displacement amount in the front-and-rear direction thereof is small. Due to this, even when a large right shock absorber and left shock absorber are mounted on the vehicle to ensure a large displacement amount, it is difficult for the vehicle to be enlarged in size in the front-and-rear direction. This enables a vehicle having a large maximum banking angle and a large displacement amount of the shock absorbers while preventing the enlargement of the vehicle not only in the left-and-right direction but also in the front-and-rear direction.

In addition, although the right shock absorber and the left shock absorber include a spring element and a damper element, the right guide and the left guide do not have to include a spring element or a damper element. Then, the right guide is smaller in size than the right shock absorber. Due to this, the right shock absorber is small in size, compared with a case where the right shock absorber includes two telescoping telescopic elements. The left guide is smaller in size than the left shock absorber. Due to this, the left shock absorber is small in size, compared with a case where the left shock absorber includes two telescoping telescopic elements.

In a preferred embodiment of the present invention, the body frame preferably includes a right frame at least a portion of which is provided behind the link support and a left frame at least a portion of which is provided behind the link support and on the left of the right frame, and the first shaft support is preferably supported on the right frame and the left frame.

According to the vehicle configured as described above, the first shaft support is supported by the right frame and the left frame, such that the first shaft support is supported with high rigidity in the left-and-right direction.

In a preferred embodiment of the present invention, when seen from the front of the vehicle, at least a portion of the first shaft support may overlap the upper cross member.

According to the vehicle configured as described above, a headstock does not have to be disposed above the linkage unlike in International Patent Publication No. 2014/065396, and at least a portion of the headstock is disposed so as to overlap the upper cross member as seen from the front of the vehicle. Due to this, the vehicle is compact in size in relation to the up-and-down direction of the body frame.

In a preferred embodiment of the present invention, the first shaft support is preferably separate from the body frame.

According to the vehicle configured as described above, since the first shaft support is separate from the body frame, the first shaft support is easy to be worked on. Due to this, since the first shaft support is worked on with high precision, the steering force input is supported with high accuracy.

In a preferred embodiment of the present invention, the connector preferably includes a first connector that is fixed to the steering shaft so as not to turn relative thereto; a second connector that is connected to the first connector so as to turn relative thereto; and a third connector that is connected to the second connector so as to turn relative thereto and which is fixed to the relay shaft so as not to turn relative thereto, and, when seen from a side of the vehicle, the third connector is preferably disposed above the middle upper axis in relation to the up-and-down direction of the body frame, and at least a portion of the first connector is disposed below the third connector.

According to the vehicle configured as described above, since the first connector is provided in a relatively low position, the steering shaft is provided in a relatively low position, such that the steering force input that is connected to the steering shaft is disposed in a relatively low position.

In a preferred embodiment of the present invention, a length of the second connector is preferably adjustable.

According to the vehicle configured as described above, when fabricating the vehicle, due to errors in parts and dimensions, there may occur a case where a neutral position of the two front wheels (the postures of the front wheels when wheel axes are at right angles to a traveling direction) deviates from a neutral position of the steering force input (the posture of the steering force input when a line connecting a left grip portion and a right grip portion is at a right angle to the traveling direction). Even in such a case, by adjusting the length of the second connector, the neutral position of the two front wheels is aligned with the neutral position of the steering force input. This enhances the yield of the product.

In a preferred embodiment of the present invention, when seen from the top of the vehicle, a turning radius of a connecting point between the first connector and the second connector about the rear steering axis is preferably greater than a turning radius of a connecting point between the second connector and the third connector about the front steering axis.

According to the vehicle configured as described above, the displacement of the two front wheels when steered is greater than the displacement of the steering force input when turned, and therefore, the right front wheel and the left front wheel is steered a large amount only by displacing the steering force input by a small amount.

In a preferred embodiment of the present invention, when seen from the top of the vehicle, a turning radius of a connecting point between the first connector and the second connector about the rear steering axis is preferably smaller than a turning radius of a connecting point between the second connector and the third connector about the front steering axis.

According to the vehicle configured as described above, the displacement of the two front wheels when steered is smaller than the displacement of the steering force input when turned, and therefore, the operation of the steering force input becomes easy.

In a preferred embodiment of the present invention, the link support that supports the upper cross member and the lower cross member so as to turn and a member that supports the relay shaft so as to turn are preferably integral with each other, and the relay shaft preferably penetrates the member with which the relay shaft is integral.

According to the vehicle configured as described above, since high rigidity is required of the member to which the upper cross member and the lower cross member are attached, the rigidity of the member is high. In order to ensure high rigidity with a small amount of material, it is desirable to use a hollow shape, for example a cylindrical shape. Then, according to the vehicle configured in the way described above, the relay shaft is inserted through an interior of the hollow member that supports the upper cross member and the lower cross member, and therefore, the efficient use of space is enhanced. In addition, the member that supports the upper cross member and the lower cross member and the member that supports the relay shaft so as to turn are the same, and therefore, the number of parts is reduced.

In a preferred embodiment of the present invention, when seen from the side of the vehicle, the rear steering axis is preferably disposed behind the movable range of the rear cross element.

According to the vehicle as described above, the rear cross element is easily prevented from interfering with a handlebar.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8 is a side view showing a steering force transmission.

FIG. 11 is a plan view showing schematically a link support, a headstock, a right frame, and a left frame.

FIG. 12 is a front view of the steering force transmission.

DETAILED DESCRIPTION OF THE PREFERRED EMBODIMENTS

Figure 1:
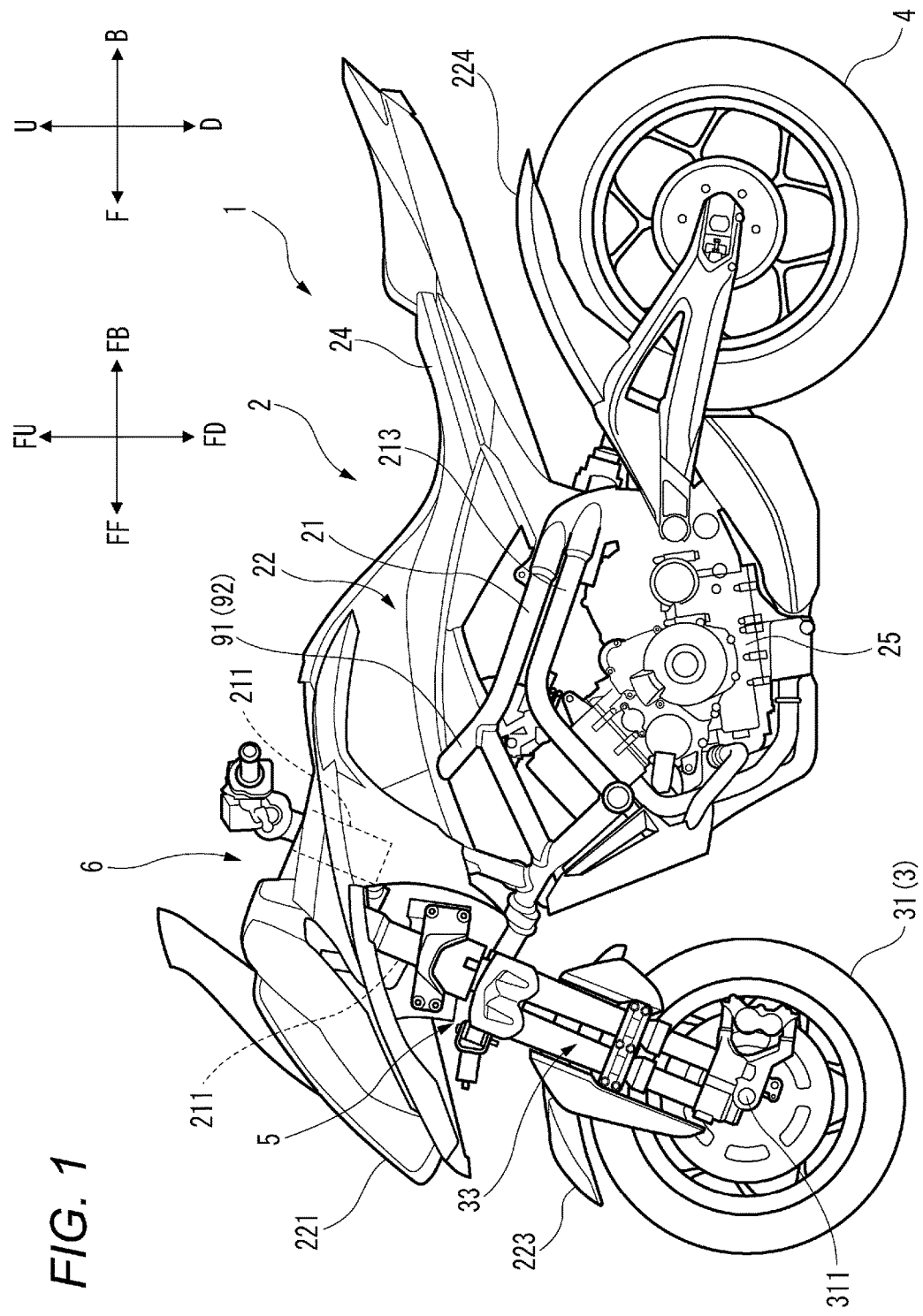
FIG. 1 is a side view showing an entire vehicle according to a preferred embodiment of the present invention as seen from a left side thereof.

Referring to the accompanying drawings, preferred embodiments of the present invention will be described in detail below.

In the accompanying drawings, an arrow F denotes a front or forward direction of a vehicle. An arrow B denotes a back/rear or backward/rearward direction of the vehicle. An arrow U denotes an up or upward direction of the vehicle. An arrow D denotes a down or downward direction of the vehicle. An arrow R denotes a right or rightward direction of the vehicle. An arrow L denotes a left or leftward direction of the vehicle.

A vehicle turns with a body frame leaning in a left-right direction of the vehicle relative to a vertical direction. In addition to the directions based on the vehicle, directions based on the body frame will be defined. In the accompanying drawings, an arrow FF denotes a front or forward direction of the body frame. An arrow FB denotes a back/rear or backward/rearward of the body frame. An arrow FU denotes an up or upward direction of the body frame. An arrow FD denotes a down or downward direction of the body frame. An arrow FR denotes a right or rightward direction of the body frame. An arrow FL denotes a left or leftward direction of the body frame.

In this description, a "front-and-rear direction of the body frame," a "left-and-right direction of the body frame" and an "up-and-down direction of the body frame" mean a front-and-rear direction, a left-and-right direction and an up-and-down direction based on the body frame as viewed from a rider who rides the vehicle. "A side of or sideways of the body frame" means directly on the right or left of the body frame. "A side of or sideways of the body frame" means directly on the right or left of the body frame.

In this description, an expression reading "something extends in the front-and-rear direction of the body frame" includes a situation in which something extends while being inclined in relation to the front-and-rear direction of the body frame and means that something extends with a gradient which is closer to the front-and-rear direction of the body frame rather than the left-and-right direction and the up-and-down direction of the body frame.

In this description, an expression reading "something extends in the left-and-right direction of the body frame" includes a situation in which something extends while being inclined in relation to the left-and-right direction of the body frame and means that something extends with a gradient which is closer to the left-and-right direction of the body frame rather than the front-and-rear direction of the body frame and the up-and-down direction of the body frame.

In this description, an expression reading "something extends in the up-and-down direction of the body frame" includes a situation in which something extends while being inclined in relation to the up-and-down direction of the body frame and means that something extends with a gradient which is closer to the up-and-down direction of the body frame rather than the front-and-rear direction of the body frame and the left-and-right direction of the body frame.

In this description, an expression reading the "body frame stands upright or is in an upright state" means a state in which the up-and-down direction of the body frame coincides with the vertical direction in such a state that the vehicle is not steered at all. In this state, the directions based on the vehicle and the directions based on the vehicle frame coincide with each other. When the vehicle is turning with the body frame caused to lean to the left or right direction from the vertical direction, the left-and-right direction of the vehicle does not coincide with the left-and-right direction of the body frame. Likewise, the up-and-down direction of the vehicle does not coincide with the up-and-down direction of the body frame. However, the front-and-rear direction of the vehicle coincides with the front-and-rear direction of the body frame.

In this description, "rotation or rotating" means that a member is displaced at an angle of 360 degrees or more about a center axis thereof. In this description, "turning" means that a member is displaced at an angle of less than 360 degrees about a center axis thereof.

Referring to FIGS. 1 to 7, a vehicle 1 according to preferred embodiments of the present invention will be described. The vehicle 1 is driven by power generated from a power source and which includes a body frame which is able to lean and two front wheels which are aligned side by side in a left-and-right direction of the body frame.

FIG. 1 is a left side view showing the entire vehicle 1 as viewed from the left thereof. The vehicle 1 includes a vehicle main body portion 2, a pair of left and right front wheels 3, a rear wheel 4, a linkage 5 and a steering force transmission 6.

The vehicle main body portion 2 includes a body frame 21, a body cover 22, a seat 24 and an engine unit 25. In FIG. 1, the vehicle 1 is standing upright or is in an upright state. The following description which will be made by reference to FIG. 1 is based on the premise that the vehicle 1 is standing in the upright state.

The body frame 21 extends in the front-and-rear direction of the vehicle 1. The body frame 21 includes a headstock 211 (refer to FIG. 4: an example of a first shaft support), a link support 212 (refer to FIG. 4: an example of a second shaft support), an engine support 213, a left frame 91 and a right frame 92.

The headstock 211 supports an upstream side steering shaft 60, which will be described below, so as to turn. The headstock 211 extends in an up-and-down direction of the body frame 21.

The link support 212 is provided ahead of the headstock 211 in a front-and-rear direction of the vehicle 1. The link support 212 supports the linkage 5 so as to turn.

The engine support 213 is provided behind the headstock 211 in the front-and-rear direction of the vehicle 1. The engine support 213 supports the engine unit 25. The engine unit 25 supports the rear wheel 4 so as to allow the rotation thereof. The engine unit 25 includes a power source such as an engine, an electric motor, a battery or the like and a device such as a transmission. The power source generates a force by which the vehicle 1 is driven.

The right frame 92 is provided on the right of the left frame 91 in relation to a left-and-right direction of the vehicle. The right frame 92 and the left frame 91 preferably have a laterally symmetrical shape. The left frame 91 and the right frame 92 connect the headstock 211, the link support 212 and the engine support 213 together.

The body cover 22 includes a front cover 221, a pair of left and right front mudguards 223 and a rear mudguard 224. The body cover 22 is a body portion which covers at least a portion of body elements which are mounted on the vehicle 1 such as the pair of left and right front wheels 3, the body frame 21, the linkage 5 and the like.

The front cover 221 is disposed ahead of the seat 24. The front cover 221 covers the linkage 5 and at least a portion of the steering force transmission 6.

At least portions of the pair of left and right front mudguards 223 are individually disposed directly below the front cover 221. At least portions of the pair of left and right front mudguards 223 are disposed directly above the pair of left and right front wheels 3, respectively.

At least a portion of the rear mudguard 224 is disposed directly above the rear wheel 4.

At least portions of the pair of left and right front wheels 3 are disposed directly below the front cover 221.

At least a portion of the rear wheel 4 is disposed below the seat 24. At least a portion of the rear wheel 4 is disposed directly below the rear fender 224.

Figure 2:
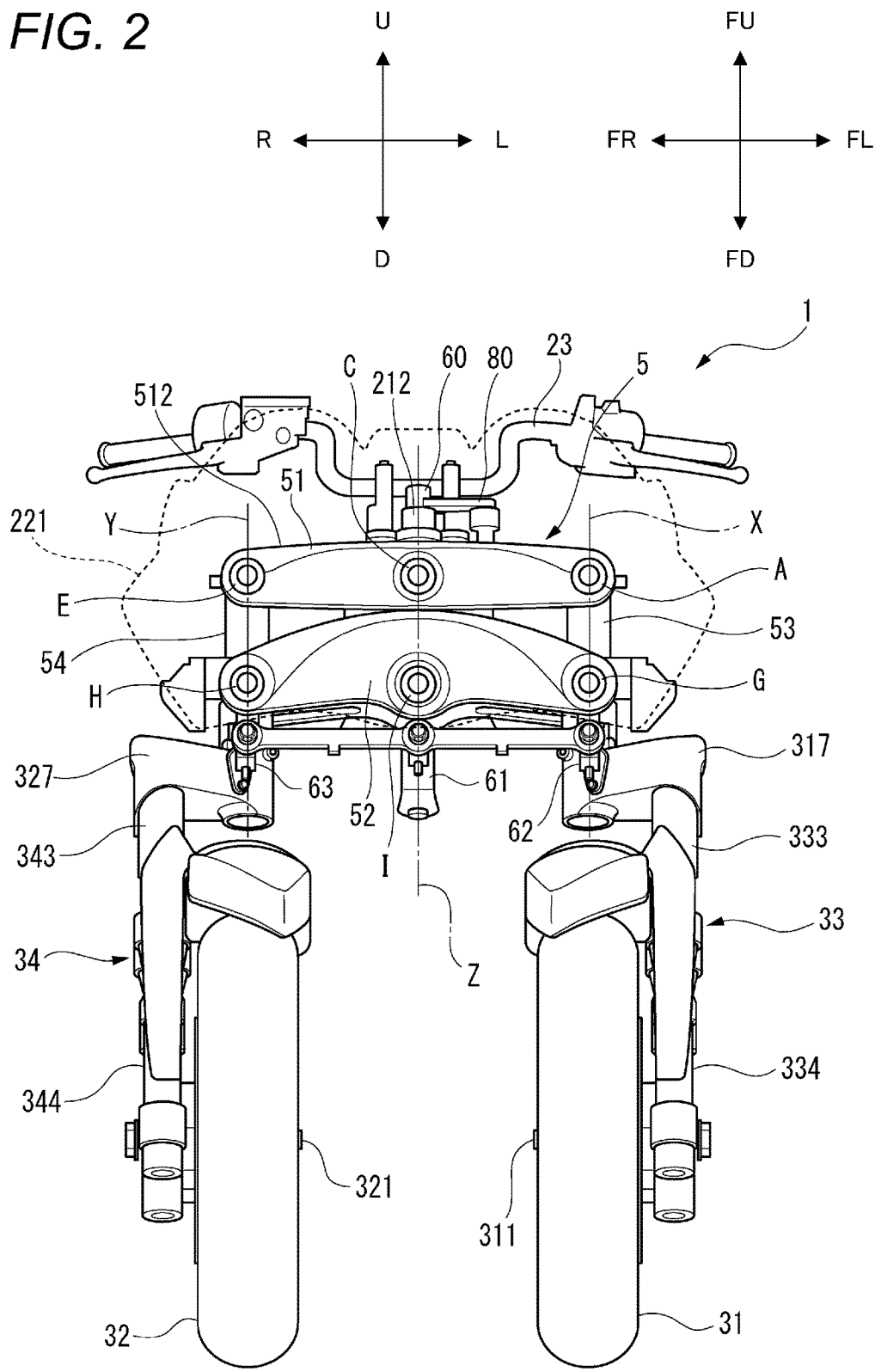
FIG. 2 is a front view showing a front portion of the vehicle shown in FIG. 1.

FIG. 2 is a front view of the front portion of the vehicle 1 as viewed from the front of the body frame 21. In FIG. 2, the vehicle 1 is standing in an upright state. The following description which will be made by reference to FIG. 2 is based on the premise that the vehicle 1 is standing upright or in the upright state. FIG. 2 shows the front portion of the vehicle 1 as seen through the front cover 221 that is indicated by dashed lines.

The pair of left and right front wheels 3 includes a left front wheel 31 and a right front wheel 32. The left front wheel 31 and the right front wheel 32 are aligned side by side in the left-and-right direction of the body frame 21. The right front wheel 32 is provided on the right of the left front wheel 31 on the body frame 21.

The vehicle 1 includes a left shock absorber 33, a right shock absorber 34, a left bracket 317 and a right bracket 327.

Figure 3:
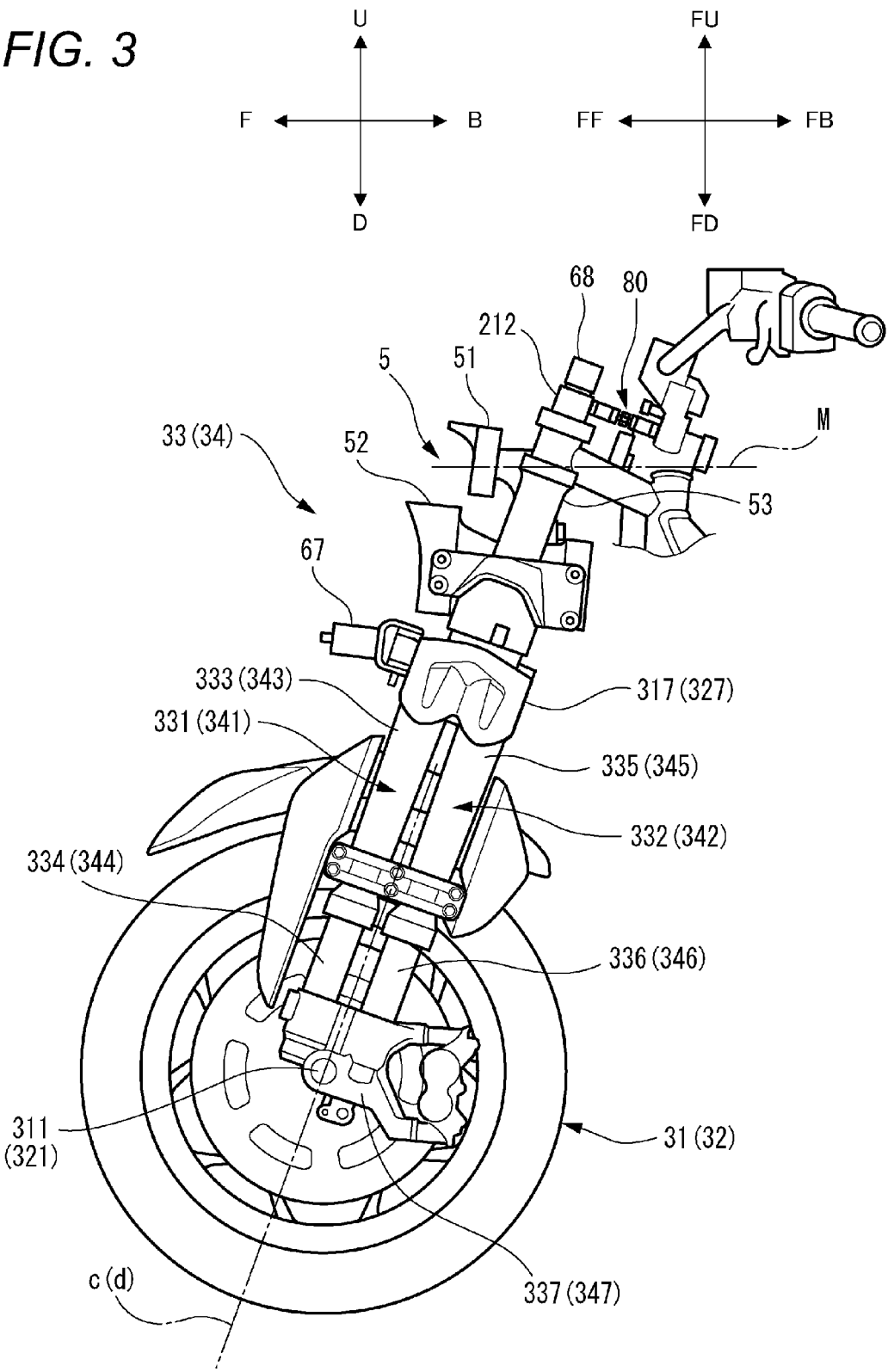
FIG. 3 is a side view showing a left shock absorber and a left front wheel.

FIG. 3 is a side view showing the left shock absorber 33 and the left front wheel 31. The right shock absorber 34 and the left shock absorber 33 are constructed laterally symmetrically with each other, and therefore, reference numerals denoting the right shock absorber 34 are also written in FIG. 3.

As shown in FIG. 3, the left shock absorber 33 is preferably a so-called telescopic shock absorber. The left shock absorber 33 includes a left front telescopic element 331, a left rear telescopic element 332 and a left inner connector 337.

The left front telescopic element 331 includes a left front outer tube 333 and a left front inner tube 334. A lower portion of the left front inner tube 334 is connected to the left inner connector 337. An upper portion of the left front inner tube 334 is inserted into the left front outer tube 333. An upper portion of the left front outer tube 333 is connected to the left bracket 317. The left front inner tube 334 is displaced relative to the left front outer tube 333 along a left extending and contracting axis c that extends in the up-and-down direction of the body frame 21. The left front telescopic element 331 is able to extend and contract in the direction of the left extending and contracting axis c as a result of the left front inner tube 334 being displaced relative to the left front outer tube 333 along the left extending and contracting axis c.

At least a portion of the left rear telescopic element 332 is provided behind the left front telescopic element 331. The left rear telescopic element 332 includes a left rear outer tube 335 and a left rear inner tube 336. The left rear outer tube 335 and the left front outer tube 333 are connected together so as not to move.

A lower portion of the left rear inner tube 336 is connected to the left inner connector 337. An upper portion of the left rear inner tube 336 is inserted into the left rear outer tube 335. An upper portion of the left rear outer tube 335 is connected to the left bracket 317.

The left rear inner tube 336 is displaced relative to the left rear outer tube 335 along the left extending and contracting axis c that extends in the up-and-down direction of the body frame 21. The left rear telescopic element 332 is able to extend and contract in the direction of the left extending and contracting axis c as a result of the left rear inner tube 336 being displaced relative to the left rear outer tube 335 along the left extending and contracting axis c.

The left inner connector 337 rotatably supports a left axle member 311 of the left front wheel 31. The left inner connector 337 connects a lower portion of the left front inner tube 334 and a lower portion of the left rear inner tube 336 together.

The left shock absorber 33 attenuates the displacement of the left front wheel 31 relative to the left front outer tube 333 and the left rear outer tube 335 along the left extending and contracting axis c as a result of the left front telescopic element 331 extending or contracting and the left rear telescopic element 332 extending or contracting.

As shown in FIG. 3, the right shock absorber 34 is preferably a so-called telescopic shock absorber. The right shock absorber 34 includes a right front telescopic element 341, a right rear telescopic element 342 and a right inner connector 347.

The right front telescopic element 341 includes a right front outer tube 343 and a right front inner tube 344. A lower portion of the right front inner tube 344 is connected to the right inner connector 347. An upper portion of the right front inner tube 344 is inserted into the right front outer tube 343. An upper portion of the right front outer tube 343 is connected to the right bracket 327. The right front inner tube 344 is displaced relative to the right front outer tube 343 along a right extending and contracting axis d that extends in the up-and-down direction of the body frame 21. The right front telescopic element 341 is able to extend and contract in the direction of the right extending and contracting axis d as a result of the right front inner tube 344 being displaced relative to the right front outer tube 343 along the right extending and contracting axis d.

At least a portion of the right rear telescopic element 342 is provided behind the right front telescopic element 341. The right rear telescopic element 342 includes a right rear outer tube 345 and a right rear inner tube 346. The right rear outer tube 345 and the right front outer tube 343 are connected together so as not to move.

A lower portion of the right rear inner tube 346 is connected to the right inner connector 347. An upper portion of the right rear inner tube 346 is inserted into the right rear outer tube 345. An upper portion of the right rear outer tube 345 is connected to the right bracket 327.

The right rear inner tube 346 is displaced relative to the right rear outer tube 345 along the right extending and contracting axis d that extends in the up-and-down direction of the body frame 21. The right rear telescopic element 342 is able to extend and contract in the direction of the right extending and contracting axis d as a result of the right rear inner tube 346 being displaced relative to the right rear outer tube 345 along the right extending and contracting axis d.

The right inner connector 347 rotatably supports a right axle member 321 of the right front wheel 32. The right inner connector 347 connects a lower portion of the right front inner tube 344 and a lower portion of the right rear inner tube 346 together.

The right shock absorber 34 attenuates the displacement of the right front wheel 32 relative to the right front outer tube 343 and the right rear outer tube 345 along the right extending and contracting axis d as a result of the right front telescopic element 341 extending or contracting and the right rear telescopic element 342 extending or contracting.

Figure 4:
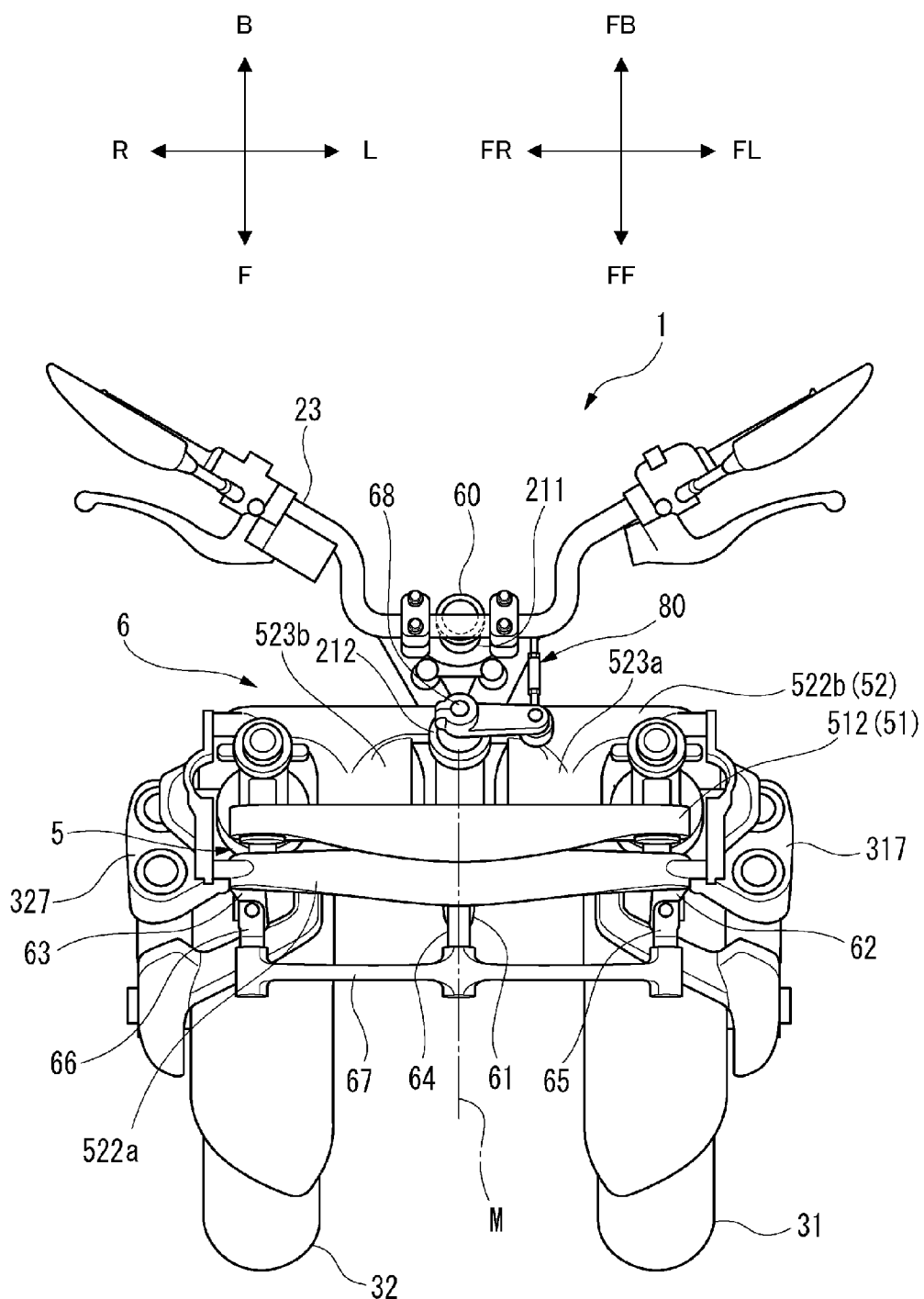
FIG. 4 is a plan view showing the front portion of the vehicle shown in FIG. 1.

As shown in FIG. 4, the vehicle 1 includes the steering force transmission 6. The steering force transmission 6 includes a handlebar 23 (an example of a steering force input), the upstream side steering shaft 60, a connector 80, and a downstream side steering shaft 68.

The body frame 21 includes the headstock 211 that supports the upstream side steering shaft 60 so as to turn and the link support 212 that supports the downstream side steering shaft 68 so as to turn. The link support 212 extends in the direction of a middle center axis Z that extends in the up-and-down direction of the body frame 21, as shown in FIG. 2.

A steering force is inputted into the handlebar 23. The upstream side steering shaft 60 is connected to the handlebar 23. An upper portion of the upstream side steering shaft 60 is disposed behind a lower portion of the upstream side steering shaft 60 in a front-and-rear direction of the body frame 21. The upstream side steering shaft 60 is supported in the headstock 211 so as to turn.

The connector 80 connects the upstream side steering shaft 60 and the downstream side steering shaft 68 together. The connector 80 is displaced as the upstream side steering shaft 60 turns. The connector 80 transmits the turning of the upstream side steering shaft 60 to the downstream side steering shaft 68.

The downstream side steering shaft 68 is supported in the link support 212 so as to turn. The downstream side steering shaft 68 is connected to the connector 80. The downstream side steering shaft 68 is provided ahead of the upstream side steering shaft 60 in the front-and-rear direction of the body frame 21. The downstream side steering shaft 68 turns as the connector 80 is displaced. As a result of the downstream side steering shaft 68 turning, the left front wheel 31 and the right front wheel 32 are steered via a tie-rod 67.

The steering force transmission 6 transmits a steering force exerted on the handlebar 23 by the rider when operating the handlebar 23 to the left bracket 317 and the right bracket 327. A specific configuration will be described in detail below.

In the vehicle 1 according to the present preferred embodiment, the linkage 5 preferably uses a four parallel joint link system (also referred to as a parallelogram link).

As shown in FIG. 2, the linkage 5 is disposed above the left front wheel 31 and the right front wheel 32. The linkage 5 includes an upper cross member 51, a lower cross member 52, a left side member 53 and a right side member 54. The linkage 5 is supported so as to turn by the link support 212 that extends in the direction of the middle center axis Z. Even though the upstream side steering shaft 60 is turned as a result of the operation of the handlebar 23, the linkage 5 is kept from following the rotation of the upstream side steering shaft 60 and does not turn.

The upper cross member 51 includes a plate member 512. The plate member 512 is disposed ahead of the link support 212. The plate member 512 extends in the left-and-right direction of the body frame 21.

A middle portion of the upper cross member 51 is connected to the link support 212 by a connector C. The upper cross member 51 is able to turn relative to the link support 212 about a middle upper axis M that passes through the connector C and extends in the front-and-rear direction of the body frame 21.

A left end portion of the upper cross member 51 is connected to the left side member 53 by a connector A. The upper cross member 51 is able to turn relative to the left side member 53 about a left upper axis that passes through the connector A to extend in the front-and-rear direction of the body frame 21.

A right end portion of the upper cross member 51 is connected to the right side member 54 by a connector E. The upper cross member 51 is able to turn relative to the right side member 54 about a right upper axis that passes through the connector E to extend in the front-and-rear direction of the body frame 21.

FIG. 4 is a plan view of the front portion of the vehicle 1 as seen from above the body frame 21. In FIG. 4, the vehicle 1 is standing upright. The following description which will be made by reference to FIG. 4 is based on the premise that the vehicle 1 is standing upright.

As shown in FIG. 4, the lower cross member 52 includes a front plate member 522a and a rear plate member 522b. The front plate member 522a is disposed ahead of the link support 212. The rear plate member 522b is disposed behind the link support 212. The front plate member 522a and the rear plate member 522b extend in the left-and-right direction of the body frame 21. The front plate member 522a and the rear plate member 522b are connected together by a left connecting block 523a and a right connecting block 523b. The left connecting block 523a is disposed on the left of the link support 212. The right connecting block 523b is disposed on the right of the link support 212.

Returning to FIG. 2, the lower cross member 52 is disposed below the upper cross member 51. The lower cross member 52 extends parallel to the upper cross member 51. A middle portion of the lower cross member 52 is connected to the link support 212 by a connector I. The lower cross member 52 is able to turn about a middle lower axis that passes through the connector I to extend in the front-and-rear direction of the body frame 21.

A left end portion of the lower cross member 52 is connected to the left side member 53 by a connector G. The lower cross member 52 is able to turn about a left lower axis that passes through the connector G to extend in the front-and-rear direction of the body frame 21.

A right end portion of the lower cross member 52 is connected to the right side member 54 by a connector H. The lower cross member 52 is able to turn about a right lower axis that passes through the connector H to extend in the front-and-rear direction of the body frame 21. A length of the upper cross member 51 from the connector E to the connector A is substantially equal to a length of the lower cross member from the connector H to the connector G.

The middle upper axis M, the right upper axis, the left upper axis, the middle lower axis, the right lower axis and the left lower axis extend parallel to one another. The middle upper axis M, the right upper axis, the left upper axis, the middle lower axis, the right lower axis and the left lower axis are disposed above the left front wheel 31 and the right front wheel 32.

As shown in FIGS. 2 and 4, the left side member 53 is disposed on the left of the link support 212. The left side member 53 is disposed above the left front wheel 31. The left side member 53 extends parallel to the middle center axis Z of the link support 212. An upper portion of the left side member 53 is disposed behind a lower portion thereof.

A lower portion of the left side member 53 is connected to the left bracket 317. The left bracket 317 is able to turn about a left center axis X relative to the left side member 53. The left center axis X extends parallel to the middle center axis Z of the link support 212.

As shown in FIGS. 2 and 4, the right side member 54 is disposed on the right of the link support 212. The right side member 54 is disposed above the right front wheel 32. The right side member 54 extends parallel to the middle center axis Z of the link support 212. An upper portion of the right side member 54 is disposed behind a lower portion thereof.

A lower portion of the right side member 54 is connected to the right bracket 327. The right bracket 327 is able to turn about a right center axis Y relative to the right side member 54. The right center axis X extends parallel to the middle center axis Z of the link support 212.

Thus, as has been described above, the upper cross member 51, the lower cross member 52, the left side member 53 and the right side member 54 are supported by the link support 212 so that the upper cross member 51 and the lower cross member 52 are held in postures which are parallel to each other and so that the left side member 53 and the right side member 54 are held in postures which are parallel to each other.

As shown in FIGS. 2 and 4, the steering force transmission 6 includes a middle transmission plate 61, a left transmission plate 62, a right transmission plate 63, a middle joint 64, a left joint 65, a right joint 66, and the tie-rod 67.

The middle transmission plate 61 is connected to a lower portion of the downstream side steering shaft 68. The middle transmission plate 61 cannot turn relative to the downstream side steering shaft 68. The middle transmission plate 61 is able to turn about the middle center axis Z relative to the link support 212.

The left transmission plate 62 is disposed on the left of the middle transmission plate 61. The left transmission plate 62 is connected to the left bracket 317. The left transmission plate 62 cannot turn relative to the left bracket 317. The left transmission plate 62 is able to turn about the left center axis X relative to the left side member 53.

The right transmission plate 63 is disposed on the right of the middle transmission plate 61. The right transmission plate 63 is connected to the right bracket 327. The right transmission plate 63 cannot turn relative to the right bracket 327. The right transmission plate 63 is able to turn about the right center axis Y relative to the right side member 54.

As shown in FIG. 4, the middle joint 64 is connected to a front portion of the middle transmission plate 61 via a shaft that extends in the up-and-down direction of the body frame 21. The middle transmission plate 61 and the middle joint 64 are able to turn relative to each other about this shaft.

The left joint 65 is disposed directly on the left of the middle joint 64. The left joint 65 is connected to a front portion of the left transmission plate 62 via a shaft that extends in the up-and-down direction of the body frame. The left transmission plate 62 and the left joint 65 are able to turn relative to each other about this shaft.

The right joint 66 is disposed directly on the right of the middle joint 64. The right joint 66 is connected to a front portion of the right transmission plate 63 via a shaft that extends in the up-and-down direction of the body frame. The right transmission plate 63 and the right joint 66 are able to turn relative to each other about this shaft.

A shaft that extends in the front-and-rear direction of the body frame 21 is provided at a front portion of the middle joint 64. A shaft that extends in the front-and-rear direction of the body frame 21 is provided at a front portion of the left joint 65. A shaft that extends in the front-and-rear direction of the body frame 21 is provided at a front portion of the right joint 66.

The tie-rod 67 extends in the left-and-right direction of the body frame 21. The tie-rod 67 is connected to the middle joint 64, the left joint 65 and the right joint 66 via those shafts. The tie-rod 67 and the middle joint 64 are able to turn relative to each other about the shaft that is provided at the front portion of the middle joint 64. The tie-rod 67 and the left joint 65 are able to turn relative to each other about the shaft that is provided at the front portion of the left joint 65. The tie-rod 67 and the right joint 66 are able to turn relative to each other about the shaft that is provided at the front portion of the right joint 66.

Figure 5:
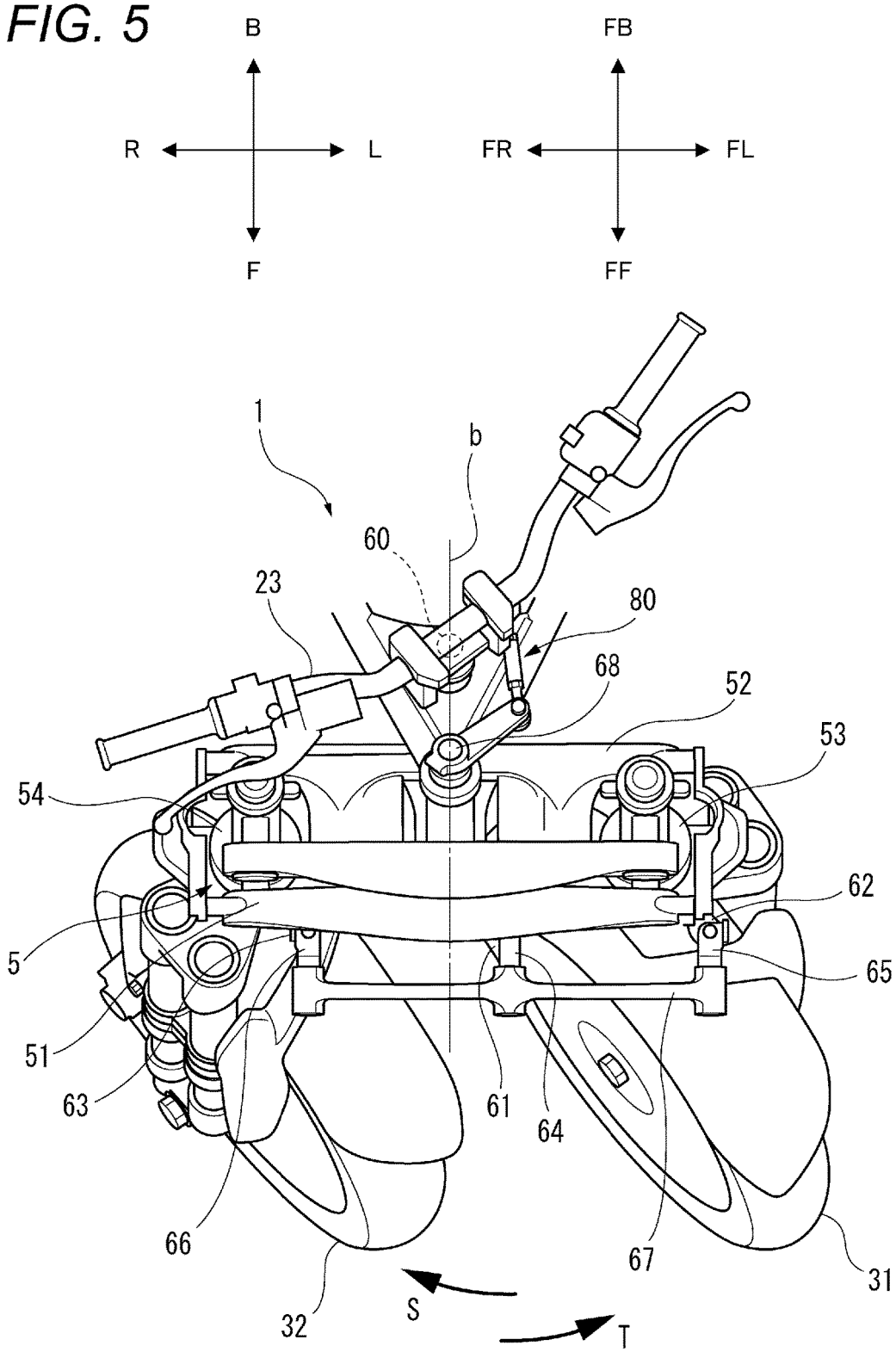
FIG. 5 is a plan view showing the front portion of the vehicle shown in FIG. 1 when the vehicle is steered.

Next, referring to FIGS. 4 and 5, a steering operation of the vehicle 1 will be described. FIG. 5 is a plan view, as seen from above the body frame 21, of the front portion of the vehicle 1 in such a state that the left front wheel 31 and the right front wheel 32 are steered or turned to the left.

When the rider operates the handlebar 23, the upstream side steering shaft 60 turns. The turning of the upstream side steering shaft 60 is transmitted to the downstream side steering shaft 68 via the connector 80. The downstream side steering shaft 68 turns relative to the link support 212 about a front steering axis b. In the case of the vehicle 1 being steered to the left as shown in FIG. 5, as the handlebar 23 is operated, the middle transmission plate 61 turns relative to the link support 212 in a direction indicated by an arrow T about the front steering axis b.

In association with the turning of the middle transmission plate 61 in the direction indicated by the arrow T, the middle joint 64 of the tie-rod 67 turns relative to the middle transmission plate 61 in a direction indicated by an arrow S. This moves the tie-rod 67 leftwards and rearwards while keeping its posture as it is.

As the tie-rod 67 moves leftwards and rearwards, the left joint 65 and the right joint 66 of the tie-rod 67 turn in the direction indicated by the arrow S relative to the left transmission plate 62 and the right transmission plate 63, respectively. This turns the left transmission plate 62 and the right transmission plate 63 in the direction indicated by the arrow T while allowing the tie-rod 67 to maintain its posture.

When the left transmission plate 62 turns in the direction indicated by the arrow T, the left bracket 317, which cannot turn relative to the left transmission plate 62, turns in the direction indicated by the arrow T about the left center axis X relative to the left side member 53.

When the right transmission plate 63 turns in the direction indicated by the arrow T, the right bracket 327, which cannot turn relative to the right transmission plate 63, turns in the direction indicated by the arrow T about the right center axis Y relative to the right side member 54.

When the left bracket 317 turns in the direction indicated by the arrow T, the left shock absorber 33, which is connected to the left bracket 317 via the left front outer tube 333 and the left rear outer tube 335, turns in the direction indicated by the arrow T about the left center axis X relative to the left side member 53. When the left shock absorber 33 turns in the direction indicated by the arrow T, the left front wheel 31, which is supported on the left shock absorber 33, turns in the direction indicated by the arrow T about the left center axis X relative to the left side member 53.

When the right bracket 327 turns in the direction indicated by the arrow T, the right shock absorber 34, which is connected to the right bracket 327 via the right front outer tube 343 and the right rear outer tube 345, turns in the direction indicated by the arrow T about the right center axis Y relative to the right side member 54. When the right shock absorber 34 turns in the direction indicated by the arrow T, the right front wheel 32, which is supported on the right shock absorber 34, turns in the direction indicated by the arrow T about the right center axis Y relative to the right side member 54.

When the rider operates the handlebar 23 so as to turn to the right, the elements described above turn in the direction indicated by the arrow S. Since the elements only move the other way around in relation to the left-and-right direction, detailed description thereof will be omitted here.

Thus, as has been described above, as the rider operates the handlebar 23, the steering force transmission 6 transmits the steering force accordingly to the left front wheel 31 and the right front wheel 32. The left front wheel 31 and the right front wheel 32 turn about the left center axis X and the right center axis Y, respectively, in the direction corresponding to the direction in which the handlebar 23 is operated by the rider.

Figure 6:
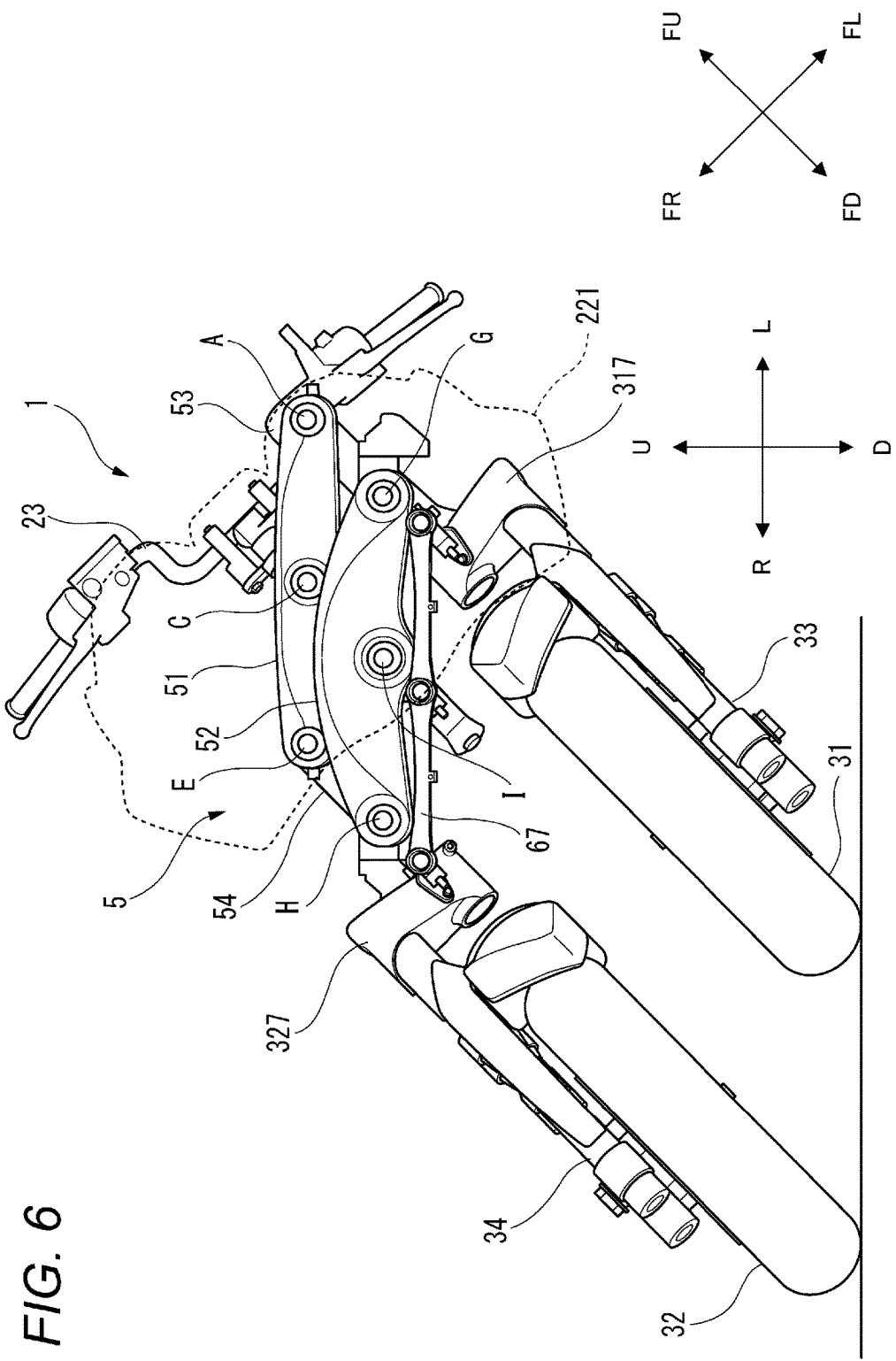
FIG. 6 is a front view showing the front portion of the vehicle shown in FIG. 1 when the vehicle is caused to lean.

Next, referring to FIGS. 2 and 6, a leaning operation of the vehicle 1 will be described. FIG. 6 is a front view of the front portion of the vehicle 1 as viewed from the front of the body frame 21 in such a state that the body frame 21 leans to the left of the vehicle 1. FIG. 6 shows a state as seen through the front cover 221 that is indicated by dashed lines.

As shown in FIG. 2, in such a state that the vehicle 1 is standing upright, when looking at the vehicle 1 from the front of the body frame 21, the linkage 5 preferably has a rectangular shape. As shown in FIG. 6, with the vehicle 1 leaning to the left, when looking at the vehicle 1 from the front of the body frame 21, the linkage 5 preferably has a parallelogram shape.

The deformation of the linkage 5 is associated with the leaning of the body frame 21 in the left-and-right direction of the vehicle 1. The operation of the linkage 5 means that the upper cross member 51, the lower cross member 52, the left side member 53 and the right side member 54 which define the linkage 5 turn relatively about turning axes which pass through the corresponding connectors A, C, E, G, H, I, such that the shape of the linkage 5 changes.

For example, as shown in FIG. 6, when the rider causes the vehicle 1 to lean to the left, the link support 212 leans to the left from the vertical direction. When the link support 212 leans, the upper cross member 51 turns counterclockwise as seen from the front of the vehicle 1 about the middle upper axis M that passes through the connector C relative to the link support 212. Similarly, the lower cross member 52 turns counterclockwise as seen from the front of the vehicle 1 about the middle lower axis that passes through the connector I relative to the link support 212. This causes the upper cross member 51 to move to the left relative to the lower cross member 52.

As the upper cross member 51 moves to the left, the upper cross member 51 turns counterclockwise as seen from the front of the vehicle 1 about the left upper axis which passes through the connector A and the right upper axis which passes through the connector E relative to the left side member 53 and the right side member 54, respectively. Similarly, the lower cross member 52 turns counterclockwise as seen from the front of the vehicle 1 about the left lower axis which passes through the connector G and the right lower axis which passes through the connector H relative to the left side member 53 and the right side member 54, respectively. This causes the left side member 53 and the right side member 54 to lean to the left from the vertical direction while allowing them to maintain postures that are parallel to the link support 212.

As this occurs, the lower cross member 52 moves to the left relative to the tie-rod 67. As the lower cross member 52 moves to the left, the shafts which are provided at the respective front portions of the middle joint 64, the left joint 65 and the right joint 66 turn relative to the-tie rod 67. This allows the tie-rod 67 to maintain a parallel posture to the upper cross member 51 and the lower cross member 52.

As the left side member 53 leans to the left, the left bracket 317 that is connected to the left side member 53 leans to the left. As the left bracket 317 leans to the left, the left shock absorber 33 which is connected to the left bracket 317 leans to the left. As the left shock absorber 33 leans to the left, the left front wheel 31 that is supported on the left shock absorber 33 leans to the left while maintaining a posture that is parallel to the link support 212.

As the right side member 54 leans to the left, the right bracket 327 that is connected to the right side member 54 leans to the left. As the right bracket 327 leans to the left, the right shock absorber 34 that is connected to the right bracket 327 leans to the left. As the right shock absorber 34 leans to the left, the right front wheel 32 that is supported on the right shock absorber 34 leans to the left while maintaining a posture that is parallel to the link support 212.

The description of the leaning operation of the left front wheel 31 and the right front wheel 32 is based on the vertical direction. However, when the vehicle 1 leans (when the linkage 5 is operated), the up-and-down direction of the body frame 21 does not coincide with the vertical up-and-down direction. In the event that the leaning operations are described based on the up-and-down direction of the body frame 21, when the linkage 5 is operated, the relative positions of the left front wheel 31 and the right front wheel 32 to the body frame 21 change. In other words, the linkage 5 changes the relative positions of the left front wheel 31 and the right front wheel 32 to the body frame 21 in the up-and-down direction of the body frame 21 to cause the body frame 21 to lean relative to the vertical direction.

When the rider causes the vehicle 1 to lean to the right, the elements lean to the right. Since the elements only move the other way around in relation to the left-and-right direction, detailed description thereof will be omitted here.

Figure 7:
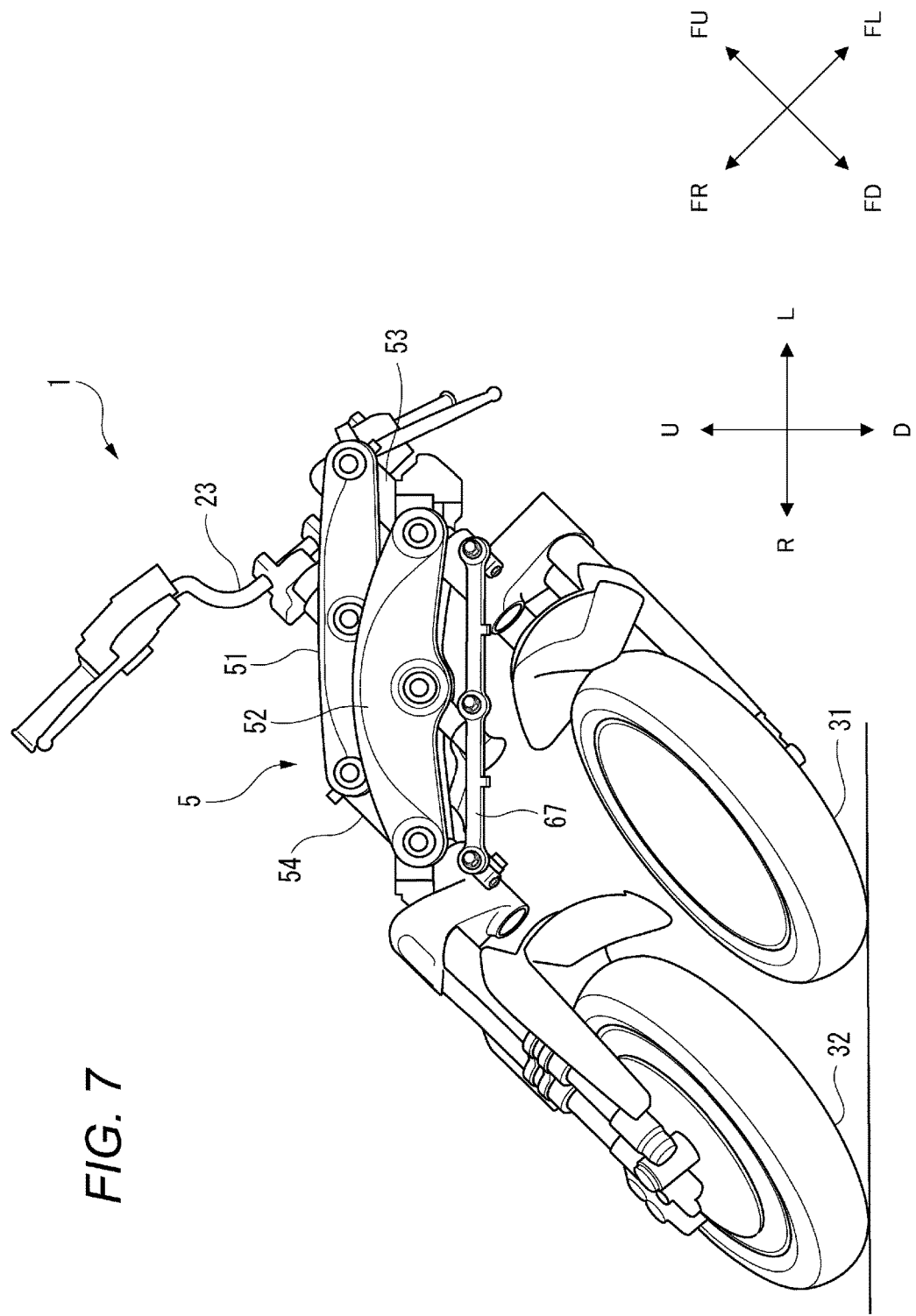
FIG. 7 is a front view showing the front portion of the vehicle shown in FIG. 1 when the vehicle is caused to lean while being steered.

FIG. 7 is a front view of the front portion of the vehicle with the vehicle 1 caused to lean and steered. FIG. 7 shows a state in which the vehicle 1 is steered or turned to the left while being caused to lean to the left. As a result of this steering operation, the left front wheel 31 and the right front wheel 32 are turned to the left, and as a result of the leaning operation, the left front wheel 31 and the right front wheel 32 lean to the left together with the body frame 21. Namely, in this state, the linkage 5 exhibits the parallelogram shape, and the tie-rod 67 moves toward the left rear from its position taken when the body frame 21 is in the upright state.

Thus, as has been described above, the vehicle 1 according to the present preferred embodiment includes the body frame 21 that is able to lean to the right of the vehicle 1 when the vehicle turns right and able to lean to the left of the vehicle 1 when the vehicle 1 turns left and which includes the link support 212 at the front portion thereof; the right front wheel 32 and the left front wheel 31 that are aligned side by side in the left-and-right direction of the body frame 21; the right shock absorber 34 that supports the right front wheel 32 at the lower portion thereof and which attenuates the upward displacement of the right front wheel 32 towards the upper portion in the up-and-down direction of the body frame 21; the left shock absorber 33 that supports the left front wheel 31 at the lower portion thereof and which attenuates the upward displacement of the left front wheel 31 towards the upper portion in the up-and-down direction of the body frame 21; the linkage 5 that supports the right shock absorber 34 and the left shock absorber 33 so as to be displaced relative to the body frame 21; and the steering force transmission 6 that transmits the steering force to the right front wheel 32 and the left front wheel 31.

The linkage 5 includes the right side member 54 that is connected to the upper portion of the right shock absorber 34 so as to turn about the right center axis Y (a right steering axis) that extends in the up-and-down direction of the body frame 21; the left side member 53 that is connected to the upper portion of the left shock absorber 33 so as to turn about the left center axis X (a left steering axis) that is parallel to the right center axis Y; the upper cross member 51 that is connected to the upper portion of the right side member 54 at the right portion so as to turn about the right upper axis that extends in the front-and-rear direction of the body frame 21, which is connected to the upper portion the left side member 53 at the left portion so as to turn about the left upper axis that is parallel to the right upper axis and which is connected to the link support 212 at the middle portion so as to turn about the middle upper axis M that is parallel to the right upper axis and the left upper axis; and the lower cross member 52 that is connected to the lower portion of the right side member 54 at the right portion so as to turn about the right lower axis that is parallel to the right upper axis, which is connected to the lower portion of the left side member 53 at the left portion so as to turn about the left lower axis that is parallel to the left upper axis and which is connected to the link support 212 at the middle portion so as to turn about the middle lower axis that is parallel to the middle upper axis M, and the lower cross member 52, which is at least one of the upper cross member 51 and the lower cross member 52, includes the front plate member 522*a* (an example of a front cross element) that is disposed ahead of the link support 212 in relation to the front-and-rear direction of the body frame 21 and the rear plate member 522*b* (an example of a rear cross element) that is disposed behind the link support 212 in relation to the front-and-rear direction of the body frame 21.

Next, the steering force transmission 6 will be described in detail.

FIG. 8 is a side view showing the steering force transmission 6. As shown in FIG. 8, the steering force transmission 6 includes the handlebar 23 (an example of a steering force input) into which the steering force is inputted, the upstream side steering shaft 60 (an example of a steering shaft), the connector 80, and the downstream side steering shaft 68 (an example of a relay shaft). The steering force transmission 6 transmits a steering force that is inputted into the handlebar 23 to the right front wheel 32 and the left front wheel 31.

The upstream side steering shaft 60 is connected to the handlebar 23. The upstream side steering shaft 60 is supported on the headstock 211 (an example of a first support) so as to turn about a rear steering axis a that extends in the up-and-down direction of the body frame 21.

An upper portion of the upstream side steering shaft 60 projects above the headstock 211. The handlebar 23 is connected to the portion of the upstream side steering shaft 60 that projects above the headstock 211. The connector 80 is connected to the portion of the upstream side steering shaft 60 that projects above the headstock 211. The connector 80 is connected to the upstream side steering shaft 60 below the handlebar 23.

Figure 9:
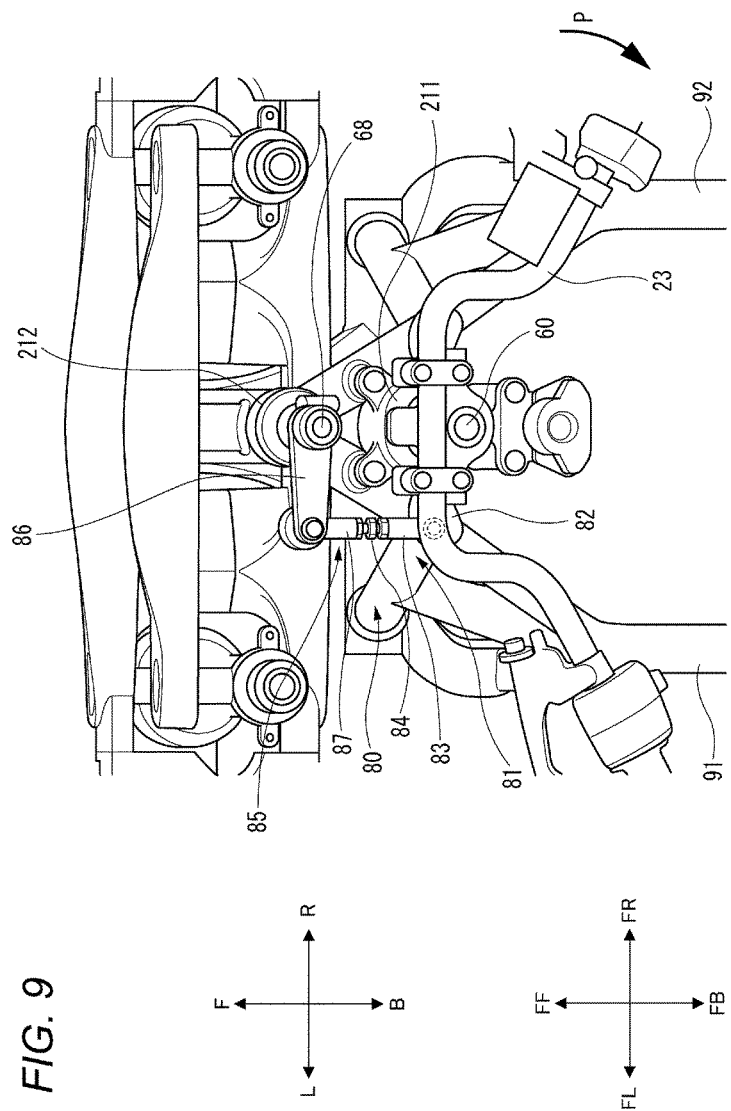
FIG. 9 is a plan view showing the steering force transmission.

FIG. 9 is a plan view showing the steering force transmission 6. As shown in FIG. 9, the connector 80 is connected to the upstream side steering shaft 60. The connector 80 is displaced as the upstream side steering shaft 60 turns.

In the present preferred embodiment, the connector 80 includes a rear element 81 that is fixed to the upstream side steering shaft 60, a front element 85 that is fixed to the downstream side steering shaft 68, and a bolt member 84 that connects the rear element 81 and the front element 85 together. In the present preferred embodiment, the bolt member 84 is provided on the left of the upstream side steering shaft 60 in the left-and-right direction of the body frame 21.

The rear element 81 includes a rear fixing portion 82 that is fixed to the upstream side steering shaft 60 and a rear thread portion 83 that is connected to the rear fixed portion 82 so as to turn about an axis that extends in the up-and-down direction of the body frame 21.

The front element 85 includes a front fixing portion 86 that is fixed to the downstream side steering shaft 68 and a front thread portion 87 that is connected to the front fixing portion 86 so as to turn about an axis that extends in the up-and-down direction of the body frame 21.

A hollow portion is provided on the rear thread portion 83 so as to open to the front, and a female thread portion is provided in an interior of the hollow portion. A hollow portion is also provided on the front thread portion 87 so as to open to the rear, and a female thread portion is provided in an interior of the hollow portion. The bolt member 84 includes male thread portions that are provided at a front portion and a rear portion thereof. The rear portion of the bolt member 84 engages in the rear thread portion 83 of the rear element 81. The front portion of the bolt member 84 engages in the front thread portion 87 of the front element 85. An engaging length of the bolt member 84 into the rear thread portion 83 and an engaging length of the bolt member 84 into the front thread portion 87 are adjusted to adjust an overall length of the connector 80 in the front-and-rear direction.

Returning to FIG. 8, the downstream side steering shaft 68 is provided downstream of the upstream side steering shaft 60 in a transmission path of a steering force that is transmitted from the handlebar 23 to the right front wheel 32 and the left front wheel 31. The downstream side steering shaft 68 is connected to the connector 80. The downstream side steering shaft 68 is able to turn about the front steering axis b that extends in the up-and-down direction of the body frame 21 as the connector 80 is displaced. In the present preferred embodiment, the rear steering axis a and the front steering axis b are parallel to each other.

The downstream side steering shaft 68 is supported on the link support 212 (an example of a second support) that is provided ahead of the headstock 211 in the front-and-rear direction of the body frame 21. As described in FIGS. 4 and 5, the downstream side steering shaft 68 displaces the tie-rod 67 in the left-and-right direction of the body frame 21 as the upstream side steering shaft 60 turns to turn the right front wheel 32 and the left front wheel 31. In the present preferred embodiment, the link support 212 supports the downstream side steering shaft 68 so as to turn and also supports the upper cross member 51 and the lower cross member 52 so as to turn.

The downstream side steering shaft 68 projects upwards and downwards from the link support 212. The connector 80 is connected to a portion of the downstream side steering shaft 68 that projects upwards from the link support 212. The middle transmission plate 61 is connected to a portion of the downstream side steering shaft 68 that projects downwards from the link support 212 to be connected to the tie-rod 67.

Figure 10A:
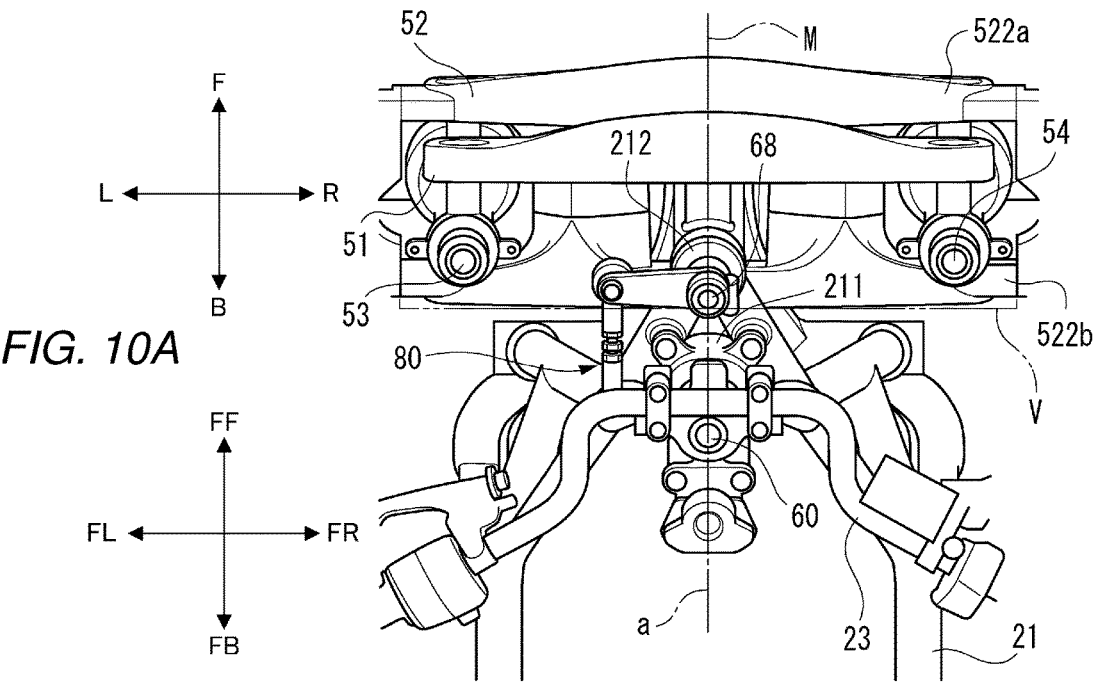
FIGS. 10A and 10B are schematic diagrams showing a movable range of a lower cross member and a rear steering axis.
Figure 10B:
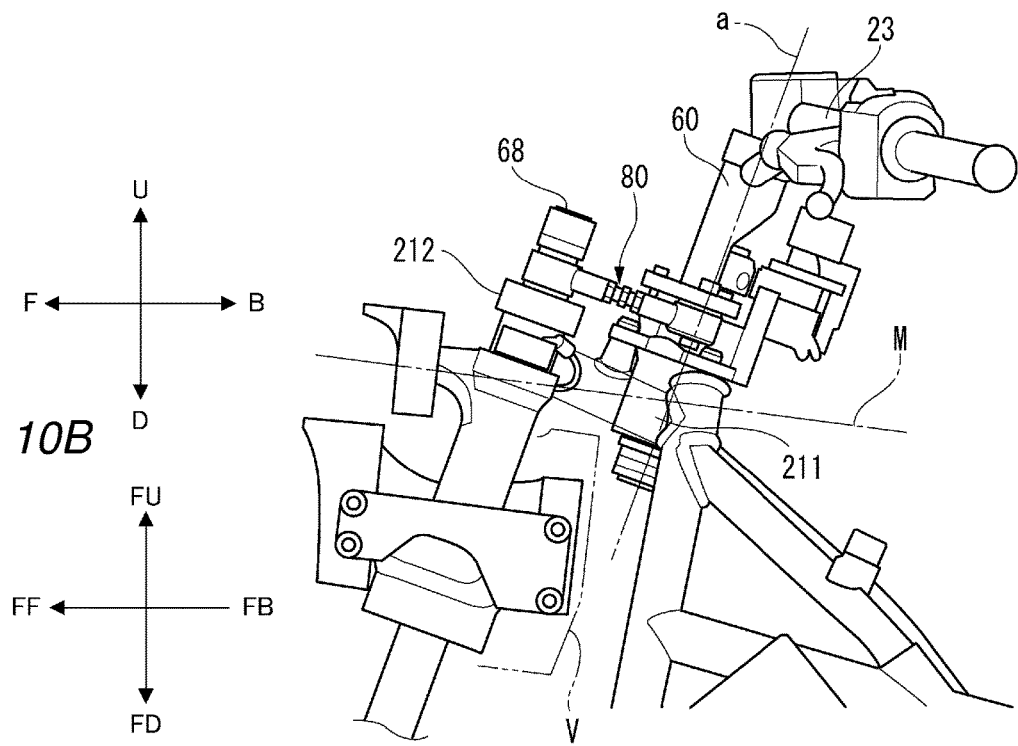

FIGS. 10A and 10B show schematic diagrams depicting a relationship between a rear end edge V of a movable range of the rear plate member 522b and the rear steering axis a. FIG. 10A is a schematic diagram showing the rear end edge V of the movable range of the rear plate member 522b and the rear steering axis a as seen from thereabove in a vertical direction, and FIG. 10B is a schematic diagram depicting the rear end edge V of the movable range of the rear plate member 522b and the rear steering axis a as seen from a side of the vehicle 1.

In FIGS. 10A and 10B, V indicated by a chain double-dashed line denotes the rear end edge of the movable range of the rear plate member 522b. As shown in FIGS. 10A and 10B, according to the vehicle 1 of the present preferred embodiment, in the steering force transmission 6 configured in the way described above, the headstock 211 that supports the upstream side steering shaft 60 is fixed to a portion of the body frame 21 that extends to the rear from the link support 212 so that at least a portion of the rear steering axis a of the upstream side steering shaft 60 is disposed behind the movable range V of the rear plate member 522b of the linkage 5 in a front-and-rear direction of the middle upper axis M. Additionally, the steering shaft 60 is disposed behind the movable range V of the rear plate member 522b of the linkage 5.

In the present preferred embodiment, the middle upper axis M does not intersect the vertical direction at a right angle. In this case, when seen from above in the vertical direction as shown in FIG. 10A, the rear end edge V of the movable range of the rear plate member 522b is shaped so that it protrudes behind a right end and a left end and is recessed at a central portion of the left-and-right direction. In the present preferred embodiment, as shown in FIG. 10B, when seen from the side of the vehicle 1, although the rear steering axis a does not overlap the movable range of the rear plate member 522b, the present invention is not limited thereto. As shown in FIG. 10A, in case the rear steering axis a is disposed behind the recess disposed in the central position in the left-and-right direction of the movable range V of the rear plate member 522b, the rear steering axis a may overlap the movable range of the rear plate member 522b when seen from the side of the vehicle 1, as shown in FIG. 10B.

Next, by reference to FIG. 9, the operation of the steering force transmission 6 will be described. When referred to in the following description, clockwise and counterclockwise represent turning directions as seen by the rider.

When the rider turns the handlebar 23 clockwise as indicated by an arrow P, the upstream side steering shaft 60 that is fixed to the handlebar 23 turns clockwise. Then, the connector 80 that is fixed to the upstream side steering shaft 60 is displaced to the front.

To describe this in detail, when the rear fixing portion 82 of the rear element 81 of the connector 80 is displaced clockwise together with the upstream side steering shaft 60, the rear thread portion 83 is displaced to the front in the front-and-rear direction of the body frame 21. The bolt member 84 and the front thread portion 87 of the front element 85 are displaced to the front in the front-and-rear direction of the body frame 21 as the rear thread portion 83 is displaced.

When the front thread portion 87 of the front element 85 is displaced to the front, the front fixing portion 86 turns the downstream side steering shaft 68 clockwise. When the downstream side steering shaft 68 turns clockwise, the tie-rod 67 is displaced to the right in the left-and-right direction of the body frame 21.

As has been described above with reference to FIGS. 4 and 5, the tie-rod 67 turns the right front wheel 32 clockwise about the right center axis Y and turns the left front wheel 31 clockwise about the left center axis X via the middle transmission plate 61, the right transmission plate 63, the left transmission plate 62, the right bracket 327, the left bracket 317 and the like. This turns the right front wheel 32 and the left front wheel 31 to the right.

When attempting to set a large maximum banking angle (maximum leaning angle) on the vehicle, as has been described above, the distance between the right member including the right shock absorber and the right front wheel and the left member including the left shock absorber and the left front wheel is increased so as to avoid interference between the right member and the left member, and this eventually enlarges not only the size of the cross members of the linkage in the left-and-right direction but also the movable range of the linkage in the left-and-right direction and the up-and-down direction. Due to this, in order to avoid interference with the linkage, the handlebar needs to be disposed upwards.

In this way, when attempting to set a large maximum banking angle on the vehicle, the handlebar has to be set in a higher position, which eventually enlarges the size of the vehicle in the up-and-down direction.

On the other hand, in general, the handlebar is disposed in a position where a rider who sits on the seat is able to extend his or her arms to reach it. Namely, the position where to dispose the handlebar is limited by the sitting position of the rider. The sitting position of the rider cannot be set in an unreasonably high position because the rider sitting on the seat has to be able to put on his or her feet on the ground. Namely, the sitting position of the rider cannot be set high, and this sitting position of the rider prevents the handlebar from being disposed in a high position.

In this way, even when attempting to set a large maximum banking angle on the vehicle, it is difficult to dispose the handlebar in a relatively high position where interference with the linkage is easily avoided due to the positional relationship with the sitting position of the rider.

Then, according to the vehicle 1 of the present preferred embodiment, as shown in FIG. 10, at least a portion of the rear steering axis a that represents the turning center of the handlebar 23 is disposed behind the movable range V of the rear plate member 522*b* of the linkage 5. This obviates the necessity of disposing the handlebar 23 in a high position to avoid interference with the linkage 5, thus making it possible for the handlebar 23 to be disposed in a reachable low position by the rider.

In addition, at least a portion of the rear steering axis a is disposed behind the movable range V of the rear plate member 522*b* of the linkage 5. This makes it difficult for the vehicle 1 to be enlarged in the up-and-down direction even though the linkage 5 and the movable range of the linkage 5 are disposed upwards to an area that is originally occupied by the handlebar 23 because the handlebar 23 is disposed not above the linkage 5 but behind the linkage 5. Additionally, even though the dimension in the left-and-right direction of the cross members 51, 52 is increased to a large maximum banking angle while avoiding interference with the left member and the right member, it is difficult for the vehicle 1 to be enlarged in the up-and-down direction by positioning the movable range of the linkage 5 in the area that is originally occupied by the handlebar 23.

In addition, in the present preferred embodiment, since the parallelogram type linkage 5 includes the member that turns about the axis M that extends in the front-and-rear direction of the body frame 21, even though the maximum banking angle is increased, it is difficult to enlarge the movable range of the linkage 5 in the front-and-rear direction of the body frame 21.

Thus, according to the present preferred embodiment, the vehicle 1 is provided which has a large maximum banking angle and which is prevented from being enlarged in size not only in the front-and-rear direction but also in the up-and-down direction.

In the vehicle 1 according to the present preferred embodiment, the maximum turning angle of the upper cross member 51 relative to the link support 212 is about 45 degrees in the clockwise direction and about 45 degrees in the counterclockwise direction. On the other hand, in the vehicle described in Non-International Patent Publication No. 2014/065396, the maximum turning angle of the upper cross member relative to the headstock is 37 degrees in the clockwise direction and 37 degrees in the counterclockwise direction.

Additionally, in the present preferred embodiment, as shown in FIG. 3, the right shock absorber 34 is a telescopic shock absorber including the right shock absorber including the right rear inner tube 346 (an example of a right inner tube) and the right rear outer tube 345 (an example of a right outer tube) and that supports the right front wheel 32 so as to be displaced as a result of the right rear inner tube 346 and the right rear outer tube 345 being displaced relatively along the right extending and contracting axis d that extends in the up-and-down direction of the body frame 21; and the right guide including the right front inner tube 344 (an example of a right guide rod) and the right front outer tube 343 (an example of a right support) that supports the right front inner tube 344 so as to slide along the axis that is parallel to the right extending and contracting axis d to permit the relative displacement between the right rear inner tube 346 and the right rear outer tube 345 along the right extending and contracting axis d while preventing the relative turning of the right rear inner tube 346 to the right rear outer tube 345 about the right extending and contracting axis d.

In the present preferred embodiment, the right rear telescopic element 342 includes the spring element and the damper element in the right rear outer tube 345, but the right front telescopic element 341 includes neither a spring element nor a damper element.

Due to this, the right rear telescopic element 342 generates a resisting force by the spring element and the damper element to attenuate the displacement of the right front wheel 32 when an impact force is inputted into the right front wheel 32. Namely, the right rear telescopic element 342 functions as the right shock absorber that supports the right front wheel 32 so as to be displaced as a result of the right rear inner tube 346 and the right rear outer tube 345 being displaced relatively along the right extending and contracting axis d extending in the up-and-down direction of the body frame 21.

In contrast with this, the right front telescopic element 341 does not generate a resisting force to attenuate the displacement of the right front wheel 32 even though an impact force is inputted into the right front wheel 32. Namely, the right front telescopic element 341 functions as the right guide that permits the relative displacement of the right rear inner tube 346 and the right rear outer tube 345 along the right extending and contracting axis d while preventing the right rear inner tube 346 from turning relative to the right rear outer tube 345 about the right extending and contracting axis d.

The left shock absorber 33 is preferably a telescopic shock absorber including the left shock absorber including the left rear inner tube 336 (an example of a left inner tube) and the left rear outer tube 335 (an example of a left outer tube) and that supports the left front wheel 31 so as to be displaced as a result of the left rear inner tube 336 and the left rear outer tube 335 being displaced relatively along the left extending and contracting axis c that extends in the up-and-down direction of the body frame 21; and the left guide including the left front inner tube 334 (an example of a left guide rod) and the left front outer tube 333 (an example of a left support) that supports the left front inner tube 334 so as to slide along the axis that is parallel to the left extending and contracting axis c to permit the relative displacement between the left rear inner tube 336 and the left rear outer tube 335 along the left extending and contracting axis c while preventing relative turning of the left rear inner tube 336 to the left rear outer tube 335 about the left extending and contracting axis c.

In the present preferred embodiment, the left rear telescopic element 332 includes the spring element and the damper element in the left rear outer tube 335, but the left front telescopic element 331 includes neither a spring element nor a damper element.

Due to this, the left rear telescopic element 332 generates a resisting force by the spring element and the damper element to attenuate the displacement of the left front wheel 31 when an impact force is inputted into the left front wheel 31. Namely, the left rear telescopic element 332 functions as the left shock absorber that supports the left front wheel 31 so as to be displaced as a result of the left rear inner tube 336 and the left rear outer tube 335 being displaced relatively along the left extending and contracting axis c extending in the up-and-down direction of the body frame 21.

In contrast with this, the left front telescopic element 331 does not generate a resisting force to attenuate the displacement of the left front wheel 31 even though an impact force is inputted into the left front wheel 31. Namely, the left front telescopic element 331 functions as the left guide that permits the relative displacement of the left inner tube 336 and the left rear outer tube 335 along the left extending and contracting axis c while preventing the left rear inner tube 336 from turning relative to the left rear outer tube 335 about the left extending and contracting axis c.

According to the vehicle 1 configured as described above, the right shock absorber 34 extends and contracts along the right extending and contracting axis d in the up-and-down direction of the body frame 21. The left shock absorber 33 extends and contracts along the left extending and contracting axis c in the up-and-down direction of the body frame 21. Namely, even when the right shock absorber 34 and the left shock absorber 33 are operated, they are displaced in a small amount in the front-and-rear direction. Due to this, even when a large right shock absorber 34 and left shock absorber 33 are mounted on the vehicle 1 to ensure a large displacement, it is difficult for the vehicle 1 to be enlarged in size in the front-and-rear direction. Due to this, this enables the vehicle 1 to have a large maximum banking angle and a large displacement amount of the shock absorbers 33, 34 while preventing the enlargement of the vehicle 1 not only in the left-and-right direction but also in the front-and-rear direction.

In addition, in the present preferred embodiment, the right rear telescopic element 342, which is the right shock absorber, and the left rear telescopic element 332, which is the left shock absorber, include the spring elements and the damper elements, but the right front telescopic element 341, which is the right guide, and the left front telescopic element 331, which is the left guide, include neither a spring element nor a damper element. The right front telescopic element 341 is smaller in size than the right rear telescopic element 342. Due to this, the right shock absorber 34 is small in size, compared with a case where the right shock absorber 34 includes two telescoping telescopic elements. The left front telescopic element 331 is smaller in size than the left rear telescopic element 332. Due to this, the left shock absorber 33 is small in size, compared with a case where the left shock absorber 33 includes two telescoping telescopic elements.

As shown in FIG. 9, the body frame 21 includes the right frame 92 at least a portion of which is provided behind the link support 212 and the left frame 91 at least a portion of which is provided behind the link support 212 and on the left of the right frame 92. The headstock 211 is supported on the right frame 92 and the left frame 91.

According to the vehicle 1 configured as described above, the headstock 211 is supported by the right frame 92 and the left frame 91 such that the headstock 211 is supported with high rigidity in the left-and-right direction.

The right frame 92 and the left frame 91 are preferably frames that support the engine unit 25 as shown in FIG. 1. Particularly high rigidity is required of the portion of the body frame 21 which supports the engine unit 25. Thus, it is preferable that the headstock 211 is supported by using the right frame 92 and the left frame 91 whose rigidity is enhanced to support the engine unit 25.

The right frame 92 and the left frame 91 are not limited to those shown in FIG. 9. FIG. 11 is a plan view showing schematically the link support 212, the headstock 211, the right frame 92, and the left frame 91. The right frame 92 and the left frame 91 may be configured as shown in FIG. 11.

In a configuration shown in FIG. 11(a), the link support 212 is supported by a front end of a right frame 92 and a front end of a left frame 91. A right rear portion of the link support 212 is supported by the front end of the right frame 92. A left rear portion of the link support 212 is supported by the front end of the left frame 91.

The headstock 211 is supported by a right middle frame 921 that extends to the left from the right frame 92 and a left middle frame 911 that extends to the right from the left frame 91 behind the link support 212 in the front-and-rear direction of the body frame 21. A right portion of the headstock 211 is supported by a left end of the right middle frame 921. A left portion of the headstock 211 is supported by a right portion of the left middle frame 911.

In a construction shown in FIG. 11(b), a right frame 92 and a left frame 91 are integrated into one unit at a front end. The link support 212 is supported at a front end of the integral right frame 92 and left frame 91. A rear end portion of the link support 212 is supported at the front end of the integral right frame 92 and left frame 91.

The headstock 211 is supported, behind the link support 212, by a first right middle frame 922 that extends to the left from the right frame 92, a second right middle frame 923 that extends to the left from the right frame 92 behind the first right middle frame 922, a first left middle frame 912 that extends to the right from the left frame 91 and a second left middle frame 913 that extends to the right from the left frame 91 behind the first left middle frame 912.

A right front portion of the headstock 211 is supported by the first right middle frame 922, and a right rear portion of the headstock 211 is supported by the second right middle frame 923. A left front portion of the headstock 211 is supported by the first left middle frame 912, and a left rear portion of the headstock 211 is supported by the second left middle frame 913.

In a construction shown in FIG. 11(c), a substantially rectangular parallelepiped right bock body 924 is fixed to a left front portion of a right frame 92. A substantially rectangular parallelepiped left block body 914 is fixed to a right front portion of a left frame 91. The right block body 924 and the left block body 914 are connected together.

First recesses 93 and second recesses 94 that are disposed behind the first recesses 93 are provided on surfaces of the right block body 924 and the left block body 914 that face each other. The first recess 93 on the right block body 924 and the first recess 93 on the left block body 914 define a hole into which the link support 212 is fixedly inserted. The second recess 94 on the right block body 924 and the second recess 94 on the left block body 914 define a hole into which the headstock 211 is fixedly inserted.

In this configuration, in place of the substantially rectangular parallelepiped block bodies, plate members may be used.

In a construction shown in FIG. 11(d), front tightening portions 95 that protrude to the front are provided individually at front ends of surfaces of front portions of a right frame 92 and a left frame 91 which face each other. Rear tightening portions 96 that protrude to the rear are provided individually at rear ends of the surfaces of front portions of the right frame 92 and the left frame 91 which face each other.

By matching the right frame 92 and the left frame 91 face to face together, a front end portion of the right frame 92 and a front end portion of the left frame 91 define a single front tightening portion 95, and a rear end portion of the right frame 92 and a rear end portion of the left frame 91 define a single rear tightening portion 96. A nut member 97 is tightened on to the front tightening portion 95, and a nut member 98 is tightened on to the rear tightening portion 96, such that the right frame 92 and the left frame 91 are fixed together strongly and rigidly.

The first recesses 93 and the second recesses 94 that are disposed behind the first recesses 93 are provided on the surfaces of the front portion of the right frame 92 and the front portion of the left frame 91 that face each other. The first recess 93 on the right frame 92 and the first recess 93 of the left frame 91 define the hole into which the link support 212 is fixedly inserted. The second recess 94 on the right frame 92 and the second recess 94 of the left frame 91 define the hole into which the headstock 211 is fixedly inserted.

By setting a diameter of the hole that are defined by the first recesses 93 to be slightly smaller than an outside diameter of the link support 212, the link support 212 is supported strongly and rigidly by the right frame 92 and the left frame 91 in a simple manner by tightening the front tightening portion 95 and the rear tightening portion 96 by the nut members 97, 98, respectively.

Alternatively, by setting a diameter of the hole that are defined by the second recesses 94 to be slightly smaller than an outside diameter of the headstock 211, the headstock 211 is supported strongly and rigidly in a simple manner by the right frame 92 and the left frame 91 by tightening the front tightening portion 95 and the rear tightening portion 96 by the nut members 97, 98, respectively.

FIG. 12 is a front view of the steering force transmission 6. In FIG. 12, the link support 212 is omitted from illustration. In the present preferred embodiment, as shown in FIG. 12, when seen from the front of the vehicle 1, at least a portion of the headstock 211 overlaps the upper cross member 51.

According to the vehicle 1 configured as described above, the headstock does not have to be disposed above the linkage unlike International Patent Publication No. 2014/065396, and at least a portion of the headstock 211 is disposed so as to overlap the upper cross member 51 as seen from the front of the vehicle 1. Due to this, the vehicle 1 is compact in size in relation to the up-and-down direction of the body frame 21.

In a preferred embodiment of the present invention, as shown in FIG. 8, the headstock 211 is separate from the body frame 21.

Since the headstock 211 is separate from the body frame 21, the headstock 211 is easily worked on. Due to this, since the headstock 211 is worked on with high precision, the handlebar 23 is supported with high accuracy.

In addition, in a preferred embodiment of the present invention, as shown in FIGS. 8 and 9, the connector 80 includes the first connector (the rear fixing portion 82) that is fixed to the upstream side steering shaft 60 so as not to turn relative thereto; the second connector (the general term for the rear thread portion 83, the bolt member 84 and the front thread portion 87) that is connected to the first connector so as to turn relative thereto; and the third connector (the front fixing portion 86) that is connected to the second connector so as to turn relative thereto and which is fixed to the downstream side steering shaft 68 so as not to turn relative thereto.

When seen from the side of the vehicle 1, the third connector is disposed above the middle upper axis M in relation to the up-and-down direction of the body frame 21, and at least a portion of the first connector is disposed below the third connector.

According to the vehicle 1 configured as described above, since the first connector is provided in a relatively low position, the upstream side steering shaft 60 is provided in a relatively low position, such that the handlebar 23 that is connected to the upstream side steering shaft 60 is disposed in a relatively low position.

In a preferred embodiment of the present invention, the rear steering axis a and the front steering axis b are parallel to each other. In addition, the rear steering axis a is parallel to the turning axis about which the rear fixing portion 82 and the rear thread portion 83 turn relatively and the turning axis about which the front fixing portion 86 and the front thread portion 87 turn relatively.

When seen from the side of the vehicle 1, the axis that is at a right angle to the rear steering axis a is inclined relative to the middle upper axis M. The axis that is at a right angle to the rear steering axis a is inclined upwards at a front portion thereof relative to the middle upper axis M. Namely, the axis that is at a right angle to the rear steering axis a is disposed above the upper steering axis ahead of a point of intersection between the axis that is at a right angle to the rear steering axis a and the middle upper axis M. Namely, the axis that is at a right angle to the rear steering axis a is disposed below the middle upper axis M behind of the point of intersection between the axis that is at right angles to the rear steering axis a and the middle upper axis M.

The first connector, the second connector and the third connector are aligned sequentially in this order from the rear to the front in relation to the direction that is at a right angle to the rear steering axis a. Namely, at least a portion of the first connector is disposed below the third connector. Additionally, the third connector is disposed above the middle upper axis M.

Namely, according to the vehicle 1 of the present preferred embodiment, the third connector is provided above the middle upper axis M, and at least a portion of the first connector is disposed below the third connector while avoiding interference of the third connector with the upper cross member 51. This enables the upstream side steering shaft 60 on which the third connector is provided to be provided in a relatively low position, thus making it possible to prevent the enlargement in size of the vehicle 1 in the up-and-down direction.

Although the front steering axis b, the rear steering axis a, the turning axis about which the rear fixing portion 82 and the rear thread portion 83 turn relatively and the turning axis about which the front fixing portion 86 and the front thread portion 87 turn relatively are preferably parallel to one another, they may not be parallel to one another. However, in case these axes are parallel to one another, a general bearing such as a deep groove ball bearing and a roller bearing may be used as a bearing that permits the relative turning between the rear fixing portion 82 and the rear thread portion 83 and a bearing that permits the relative turning between the front fixing portion 86 and the front thread portion 87. In case those axes are not parallel, a combination of a plurality of bearings or a universal joint is used as a mechanism that permits the relative turning between the rear fixing portion 82 and the rear thread portion 83 and a mechanism that permits the relative turning between the front fixing portion 86 and the front thread portion 87.

In a preferred embodiment of the present invention, the length of the second connector (the general term for the rear thread portion 83, the bolt member 84 and the front thread portion 87) is adjustable.

According to the vehicle 1 configured as described above, when fabricating the vehicle 1, due to errors in parts and dimensions, there may occur a case where the neutral position of the two front wheels 31, 32 (the postures of the front wheels 31, 32 when the left wheel axis and the right wheel axis are at right angles to the traveling direction) deviates from the neutral position of the handlebar 23 (the posture of the handlebar 23 when the line connecting the left grip portion and the right grip portion is at a right angle to the traveling direction). Even in such a case, by adjusting the length of the second connector, the neutral position of the two front wheels 31, 32 is aligned with the neutral position of the handlebar 23. This enhance the yield of the product.

In a preferred embodiment of the present invention, when seen from the top of the vehicle 1, the turning radius of the connecting point between the first connector (the rear fixing portion 82) and the second connector (the general term for the rear thread portion 83, the bolt member 84 and the front thread portion 87) about the rear steering axis a may be greater than the turning radius of the connecting point between the second connector and the third connector (the front fixing portion 86) about the front steering axis b.

According to the vehicle 1 configured as described above, the displacement of the two front wheels 31, 32 when steered is greater than the displacement of the handlebar 23 when turned, and therefore, the right front wheel 32 and the left front wheel 31 is steered a large amount only by displacing the handlebar 23 a small amount.

On the contrary to the configuration described above, when seen from the top of the vehicle 1, the turning radius of the connecting point between the first connector and the second connector about the rear steering axis a may be smaller than the turning radius of the connecting point between the second connector and the third connector about the front steering axis b.

According to the vehicle 1 configured as described above, the displacement of the two front wheels 31, 32 when steered is smaller than the displacement of the handlebar 23 when turned, and therefore, the operation of the handlebar 23 becomes easy.

In a preferred embodiment of the present invention, the member that supports the upper cross member 51 and the lower cross member 52 so as to turn and the member (the link support 212) that supports the downstream side steering shaft 68 so as to turn are integral with each other. Namely, the member that supports the upper cross member 51 and the lower cross member 52 so as to turn and the member that supports the downstream side steering shaft 68 so as to turn are integral with each other, and the downstream side steering shaft 68 penetrates through the members that are integral with each other.

According to the vehicle 1 described above, the following advantageous effects are achieved.

Since high rigidity is required of the member to which the upper cross member 51 and the lower cross member 52 are attached, the rigidity of the member is high. In order to ensure high rigidity with a small amount of material, it is desirable to user a cylindrical shape, for example. Then, in the vehicle 1 according to the present preferred embodiment, the downstream side steering shaft 68 is inserted through the interior of the member that supports the upper cross member 51 and the lower cross member 52, and therefore, the efficient use of space is enhanced. In addition, the member that supports the upper cross member 51 and the lower cross member 52 and the member that supports the downstream side steering shaft 68 so as to turn are the same, and therefore, the number of parts is reduced.

Figure 13:
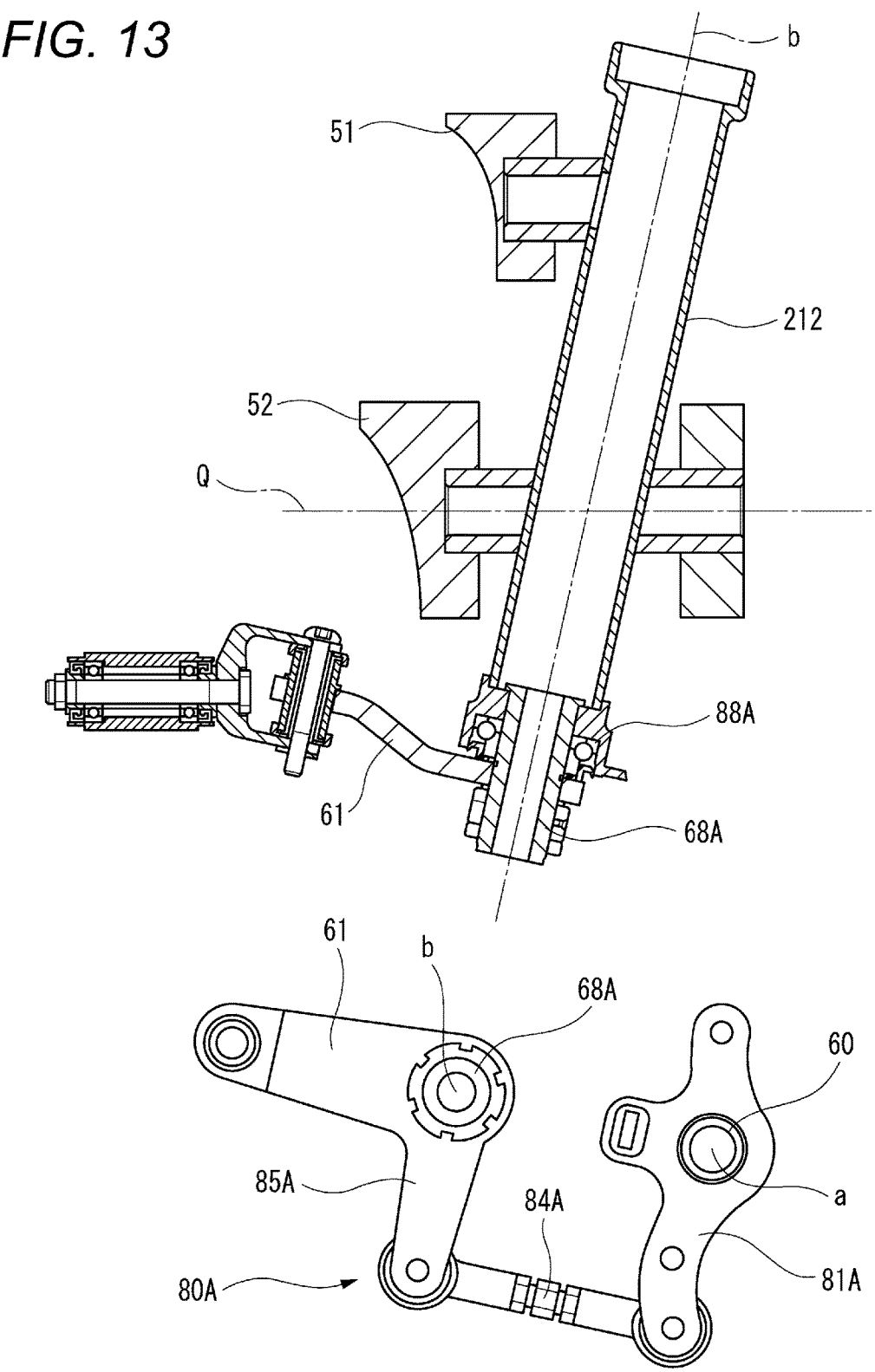
FIG. 13 is a side view showing a link support and a downstream side steering shaft according to a modified preferred embodiment of the present invention.

In a preferred embodiment of the present invention, while the downstream side steering shaft 68 is described as penetrating the cylindrical link support 212, the present invention is not limited thereto. FIG. 13 is a side view showing a link support 212 and a downstream side steering shaft 68 according to a modified preferred embodiment of the present invention.

As shown in FIG. 13, in the modified preferred embodiment, a downstream side steering shaft 68A is provided coaxially with a pipe-shaped link support 212 at a lower portion of the link support 212. The downstream side steering shaft 68A is supported by the link support 212 so as to turn. An outer circumferential surface of the downstream side steering shaft 68A is supported on an inner circumferential surface of a lower end of the pipe-shaped link support 212 via a bearing 88A. A front element 85A of a connector 80A is fixed to the downstream side steering shaft 68A so as not to turn. The front element 85A is integral with the middle transmission plate 61.

A rear element 81A of the connector 80A is fixed to a lower end of the upstream side steering shaft 60 so as not to turn. This rear element 81A is connected to the front element 85A via a bolt member 84A.

In a preferred embodiment of the present invention, as shown in FIGS. 10A and 10B, when seen from the side of the vehicle 1, the rear steering axis a is disposed behind the movable range V of the rear plate member 522b (the rear cross element).

According to the vehicle 1 as described above, the handlebar 23 and the rear plate member 522b are prevented from interfering with each other.

In a preferred embodiment of the present invention, the connector 80 is described as using a so-called linkage in which the second connector is connected to the first connector and the third connector so as to turn about the respective turning axes of the first and third connectors. The present invention is not limited to this configuration. The upstream side steering shaft 60 and the downstream side steering shaft 68 may be connected together by a gear or a chain. However, as in the present preferred embodiment, using the linkage does not generate looseness or rattling, thus preferably making it possible to transmit the turning of the upstream side steering shaft 60 to the downstream side steering shaft 68.

In a preferred embodiment of the present invention, as shown in FIG. 8, the connector 80 is disposed above the upper cross member 51, however, the present invention is not limited to this configuration. As shown in FIG. 13, the connector 80A may be disposed below the lower cross member 52.

In a preferred embodiment of the present invention, as shown in FIG. 8, the connector 80 is disposed above the upper cross member 51 on the front steering axis b, however, the present invention is not limited to this configuration. As shown in FIG. 13, the connector 80A may be disposed below the lower cross member 52 on the front steering axis b.

In a preferred embodiment of the present invention, as shown in FIG. 8, the connector 80 is disposed above the middle upper axis M on the rear steering axis a, however, the present invention is not limited to this configuration. As is seen from FIG. 13, the connector 80A may be disposed below the middle lower axis Q on the rear steering axis a.

In a preferred embodiment of the present invention, as shown in FIG. 8, the connector 80 is disposed above the upper end of the upper cross member 51 in such a state that the vehicle 1 is standing upright, however, the present invention is not limited to this configuration. As shown in FIG. 13, the connector 80A may be disposed below the lower end of the lower cross member 52 in such a state that the vehicle 1 is standing upright.

In a preferred embodiment of the present invention, as shown in FIG. 8, the connector 80 is disposed above the upper end of the upper cross member 51 on the front steering axis b in such a state that the vehicle 1 is standing upright, however, the present invention is not limited to this configuration. As is seen from FIG. 13, the connector 80A may be disposed below the lower end of the lower cross member 52 on the front steering axis b in such a state that the vehicle 1 is standing upright.

Being different from these configurations, in case the connector is disposed below the upper cross member and above the lower cross member, the distance between the upper cross member and the lower cross member becomes large in order to avoid the interference of the upper cross member with the lower cross member. Due to this, in case the connector 80 is disposed above the upper cross member 51 as shown in FIG. 8 or the connector 80A is disposed below the lower cross member 52 as shown in FIG. 13, the vehicle 1 is compact in size in the up-and-down direction while avoiding interference of the upper cross member 51 and the lower cross member 52 with the connectors 80, 80A.

In a preferred embodiment of the present invention, as shown in FIG. 8, the front plate member 522a of the lower cross member 52 is supported at the front portion of the link support 212 so as to turn. The rear plate member 522b of the lower cross member 52 is supported at the rear portion of the link support 212 so as to turn. Since the front plate member 522a and the rear plate member 522b are supported by the single link support 212, compared with a case where a member that supports the front plate member 522a and a member that supports the rear plate member 522b are prepared separately, the number of parts is reduced.

In a preferred embodiment of the present invention, as shown in FIG. 2, when seen from the front of the vehicle 1 that is standing upright and which is not steered at all, the lower end of the lower cross member 52 is disposed above the upper end of the right front wheel 32 and the upper end of the left front wheel 31.

In addition, as shown in FIG. 4, when seen from the top of the vehicle 1 that is standing upright and which is not steered at all along the front steering axis a, at least a portion of the right front wheel 32 and at least a portion of the left front wheel 31 may overlap the lower cross member 52.

These configurations provide a vehicle which is compact in the left-and-right direction.

As shown in FIG. 8, at least a portion of the rear cross element 522b of the lower cross member 52 may be disposed between the front steering axis b and the rear steering axis a.

In the preferred embodiments described above, the left shock absorber 33 and the right shock absorber 34 each preferably include the pair of telescopic mechanisms. However, depending upon the specification of the vehicle 1, the number of telescopic mechanisms that the left shock absorber 33 and the right shock absorber 34 include individually may be one.

In the preferred embodiments described above, in the left shock absorber 33, the left outer tube is described as being disposed above the left inner tube and the left front wheel 31 is described as being supported rotatably at the lower portion of the left inner tube, and in the right shock absorber 34, the right outer tube is described as being disposed above the right inner tube and the right front wheel 32 is described as being supported rotatably at the lower portion of the right inner tube, however, the present invention is not limited to this configuration. In the left shock absorber, the left inner tube may be disposed above the left outer tube and the left front wheel may be supported rotatably at the lower portion of the left outer tube, and in the right shock absorber, the right inner tube may be disposed above the right outer tube and the right front wheel may be supported rotatably at the lower portion of the right outer tube.

In the preferred embodiments described above, while the left shock absorber 33 is described as being positioned on the left side of the left front wheel 31, and the right shock absorber 34 is described as being positioned on the right side of the right front wheel 32, the present invention is not limited thereto. The left shock absorber 33 may be disposed on the right of the left front wheel 31, and the right shock absorber 34 may be disposed on the left of the right front wheel 32.

In the preferred embodiments described above, while the engine unit 25 is described as supporting the rear wheel 4 so as to oscillate, the present invention is not limited thereto. The engine unit and the rear wheel may be both supported on the body frame so as to oscillate.

In the preferred embodiments described above, the vehicle 1 includes a single rear wheel 4. However, the vehicle 1 may include a plurality of rear wheels.

In the preferred embodiments described above, the center of the rear wheel 4 in the left-and-right direction of the body frame 21 preferably coincides with the center of the space defined between the left front wheel 31 and the right front wheel 32 in the left-and-right direction of the body frame 21. Although the configuration described above is preferred, the center of the rear wheel 4 in the left-and-right direction of the body frame 21 does not have to coincide with the center of the space defined between the left front wheel 31 and the right front wheel 32 in the left-and-right direction of the body frame 21.

In the preferred embodiments described above, the linkage 5 includes the upper cross member 51 and the lower cross member 52. However, the linkage 5 may include a cross member other than the upper cross member 51 and the lower cross member 52. The "upper cross member" and the "lower cross member" are merely so called based on their relative positions in relation to the up-and-down direction. The upper cross member does not mean an uppermost cross member in the linkage 5. The upper cross member means a cross member that is located above another cross member that is located therebelow. The lower cross member does not mean a lowermost cross member in the linkage 5. The lower cross member means a cross member that is located below another cross member that is located thereabove. At least one of the upper cross member 51 and the lower cross member 52 may include two parts such as a right cross member and a left cross member. In this way, the upper cross member 51 and the lower cross member 52 may include a plurality of cross members as long as they maintain the link function.

In the preferred embodiments described above, the linkage 5 is preferably a parallel four joint link system. However, the linkage 5 may include a double wishbone configuration.

When used in this description, the word "parallel" means that it also includes two straight lines which do not intersect each other as members while they are inclined at an angle falling within the range of about ±40 degrees. When used in this description to describe a direction or a member, the expression reading "something extends along a certain direction or member" means that it includes a case where something inclines at an angle falling within the range of about ±40 degrees relative to the certain direction or member. When used in this description, the expression reading "something extends in a direction" means that it includes a case where something extends in the direction while being inclined at an angle falling within the range of about ±40 degrees relative to the direction.

The terms and expressions that are used in this description are used to describe the preferred embodiments of the present invention and hence should not be construed as limiting the scope of the present invention. It should be understood that any equivalents to the characteristic matters that are shown and described in this description should not be excluded and that various modifications made within the scope of claims to be made later are permitted.

The present invention is embodied in many different forms. This description should be understood to provide preferred embodiments of the present invention. The preferred embodiments that are at least described or illustrated in this description are so described or illustrated based on the understanding that the preferred embodiments are not intended to limit the present invention.

The present invention includes every preferred embodiment which includes an equivalent element, a modification, a deletion, a combination (for example, a combination of characteristics that are described commonly in various preferred embodiments), an improvement and an alteration which is recognized by those skilled in the art to which the present invention pertains based on the preferred embodiments disclosed in this description. The limitative matters of claims should be construed broadly based on terms used in the claims and hence should not be limited by the preferred embodiments described in this description or the prosecution of this patent application. Those preferred embodiments should be construed as non-exclusive. For example, in this description, the terms "preferable or preferably" and "may" should be construed as being non-exclusive, and those terms mean, respectively, that it is "preferable but not limited thereto" and that it "may be acceptable but not limited thereto."

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a body frame that is able to lean to a right of the vehicle when the vehicle turns right and lean to a left of the vehicle when the vehicle turns left and which includes a link support at a front portion thereof;
   a right front wheel and a left front wheel that are aligned side by side in a left-and-right direction of the body frame;
   a right shock absorber that supports the right front wheel at a lower portion and which attenuates an upward displacement of the right front wheel towards an upper portion thereof in an up-and-down direction of the body frame;
   a left shock absorber that supports the left front wheel at a lower portion and which attenuates an upward displacement of the left front wheel towards an upper portion thereof in the up-and-down direction of the body frame;
   a linkage that supports the right shock absorber and the left shock absorber so as to be displaced relative to the body frame; and
   a steering transmission that transmits a steering force to the right front wheel and the left front wheel; wherein the linkage includes:
   a right side member that is connected to an upper portion of the right shock absorber so as to turn about a right steering axis that extends in the up-and-down direction of the body frame;
   a left side member that is connected to an upper portion of the left shock absorber so as to turn about a left steering axis that is parallel to the right steering axis;
   an upper cross member that is connected to an upper portion of the right side member at a right portion of the upper cross member so as to turn about a right upper axis that extends in a front-and-rear direction of the body frame, which is connected to an upper portion of the left side member at a left portion of the upper cross member so as to turn about a left upper axis that is parallel to the right upper axis, and which is connected to the link support at a middle portion of the upper cross member so as to turn about a middle upper axis that is parallel to the right upper axis and the left upper axis; and
   a lower cross member that is connect to a lower portion of the right side member at a right portion of the lower cross member so as to turn about a right lower axis that is parallel to the right upper axis, which is connected to a lower portion of the left side member at a left portion of the lower cross member so as to turn about a left lower axis that is parallel to the left upper axis, and which is connected to the link support at a middle portion of the lower cross member so as to turn about a middle lower axis that is parallel to the middle upper axis;
   at least one of the upper cross member and the lower cross member includes a front cross element that is disposed ahead of the link support in relation to the front-and-rear direction of the body frame and a rear cross element that is disposed behind the link support in relation to the front-and-rear direction of the body frame;
   the steering transmission includes:
   a steering force input into which a steering force is inputted;
   a steering shaft that is connected to the steering force input and which is supported on a first shaft support so as to turn about a rear steering axis that extends in an up-and-down direction of the body frame;
   a connector that is connected to the steering shaft and which is displaced as the steering shaft turns; and
   a relay shaft that is connected to the connector, which is able to turn about a front steering axis that extends in the up-and-down direction of the body frame as the connector is displaced, which is supported on a second shaft support that is provided ahead of the first shaft support in the front-and-rear direction of the body frame, and which steers the right front wheel and the left front wheel as the second shaft support turns;
   the first shaft steering support that supports the steering shaft is fixed to a portion of the body frame that extends rearwards from the link support so that at least a portion of the rear steering axis of the steering shaft is disposed behind a movable range of the rear cross element of the linkage in relation to a front-and-rear direction of the middle upper axis.

2. The vehicle according to claim 1, wherein the right shock absorber is a telescopic shock absorber including:
   a right shock absorber including a right inner tube and a right outer tube and that supports the right front wheel so as to be displaced as a result of the right inner tube and the right outer tube being displaced relatively along a right extending and contracting axis that extends in the up-and-down direction of the body frame; and a right guide including a right guide rod and a right support that supports the right guide rod so as to slide along an axis that is parallel to the right extending and contracting axis to permit a relative displacement between the right inner tube and the right outer tube along the right extending and contracting axis while preventing relative turning of the right inner tube to the right outer tube about the right extending and contracting axis;

the left shock absorber is a telescopic shock absorber including:

a left shock absorber including a left inner tube and a left outer tube and that supports the left front wheel so as to be displaced as a result of the left inner tube and the left outer tube being displaced relatively along a left extending and contracting axis that extends in the up-and-down direction of the body frame; and a left guide including a left guide rod and a left support that supports the left guide rod so as to slide along an axis that is parallel to the left extending and contracting axis to permit a relative displacement between the left inner tube and the left outer tube along the left extending and contracting axis while preventing relative turning of the left inner tube to the left outer tube about the left extending and contracting axis.

3. The vehicle according to claim 1, wherein the body frame includes a right frame at least a portion of which is provided behind the link support and a left frame at least a portion of which is provided behind the link support and on the left of the right frame, and the first shaft support is supported on the right frame and the left frame.

4. The vehicle according to claim 1, wherein, when seen from a front of the vehicle, at least a portion of the first shaft support overlaps the upper cross member.

5. The vehicle according to claim 1, wherein the first shaft support is separate from the body frame.

6. The vehicle according to claim 1, wherein the connector includes:

a first connector that is fixed to the steering shaft so as not to turn relative thereto;

a second connector that is connected to the first connector so as to turn relative thereto; and a third connector that is connected to the second connector so as to turn relative thereto and which is fixed to the relay shaft so as not to turn relative thereto; and when seen from a side of the vehicle, the third connector is disposed above the middle upper axis in relation to the up-and-down direction of the body frame, and at least a portion of the first connector is disposed below the third connector.

7. The vehicle according to claim 6, wherein a length of the second connector is adjustable.

8. The vehicle according to claim 6, wherein, when seen from a top of the vehicle, a turning radius of a connecting point between the first connector and the second connector about the rear steering axis is greater than a turning radius of a connecting point between the second connector and the third connector about the front steering axis.

9. The vehicle according to claim 6, wherein, when seen from a top of the vehicle, a turning radius of a connecting point between the first connector and the second connector about the rear steering axis is smaller than a turning radius of a connecting point between the second connector and the third connector about the front steering axis.

10. The vehicle according to claim 1, further comprising a member that supports the relay shaft so as to turn, and the member and the link support are integral; wherein the relay shaft penetrates the member.

11. The vehicle according to claim 1, wherein, when seen from a side of the vehicle, the rear steering axis is disposed behind the movable range of the rear cross element.

* * * * *